(12) United States Patent
Hougen et al.

(10) Patent No.: US 10,679,092 B2
(45) Date of Patent: Jun. 9, 2020

(54) FAST CURVE MATCHING FOR TATTOO RECOGNITION AND IDENTIFICATION

(71) Applicant: MorphoTrak, LLC, Anaheim, CA (US)

(72) Inventors: Darrell Hougen, Littleton, CO (US); Peter Zhen-Ping Lo, Mission Viejo, CA (US)

(73) Assignee: MorphoTrak, LLC, Anaheim, CA (US)

( * ) Notice: Subject to any disclaimer, the term of this patent is extended or adjusted under 35 U.S.C. 154(b) by 181 days.

(21) Appl. No.: 15/643,308

(22) Filed: Jul. 6, 2017

(65) Prior Publication Data
US 2019/0012561 A1    Jan. 10, 2019

(51) Int. Cl.
G06K 9/46    (2006.01)
G06K 9/62    (2006.01)
G06K 9/00    (2006.01)

(52) U.S. Cl.
CPC ....... *G06K 9/4638* (2013.01); *G06K 9/00885* (2013.01); *G06K 9/6202* (2013.01); *G06K 9/6211* (2013.01); *G06K 9/6215* (2013.01)

(58) Field of Classification Search
None
See application file for complete search history.

(56) References Cited

U.S. PATENT DOCUMENTS

| | | | | |
|---|---|---|---|---|
| 6,259,818 | B1 * | 7/2001 | Kim | G06K 9/48 382/242 |
| 10,095,938 | B2 | 10/2018 | Lo | |
| 2005/0264554 | A1 * | 12/2005 | Deming | G06T 11/20 345/418 |
| 2007/0286493 | A1 * | 12/2007 | Liu | G06K 9/481 382/203 |
| 2013/0177216 | A1 * | 7/2013 | Shuster | G06K 9/62 382/111 |
| 2016/0307057 | A1 | 10/2016 | Li | |
| 2018/0373946 | A1 | 12/2018 | Lo | |

FOREIGN PATENT DOCUMENTS

EP      1852806 A1 *  11/2007    ......... G06K 9/00416

OTHER PUBLICATIONS

Acton and Rossi, "Matching and Retrieval of Tattoo Images: Active Contour Cbir and Glocal Image Features," In Proc. IEEE SSIAI, 2008, 21-24.

(Continued)

*Primary Examiner* — Vikkram Bali
(74) *Attorney, Agent, or Firm* — Fish & Richardson P.C.

(57) ABSTRACT

Some implementations of the systems and techniques described include a tattoo recognition system that is capable of improving the accuracy and efficiency associated with matching edge curves extracted from tattoo images, which are typically performed during a tattoo matching operation. The system can perform a matching operation in two stages—a feature extraction stage and a matching stage. In the first stage, the system extracts one or more edge curves from the tattoo image. In the second stage, the system performs matching using a two-step comparison that compares features of the extracted edge curves.

19 Claims, 10 Drawing Sheets

(56) References Cited

OTHER PUBLICATIONS

Bernal et al., "Fast Dynamic Programming for Elastic Registration of Curves," 2016 IEEE Conference on Computer Vision and Pattern Recognition Workshops, 2016, 1066-1073.
Buchin et al., "Exact Algorithms for Partial Curve Matching via the Frechet Distance," Proceedings of the twentieth annual ACM-SIAM symposium on Discrete algorithms, 2009, 645-654.
Cardoze and Schulman, "Pattern Matching for Spatial Point Sets," In Proc. 39th IEEE Foundations of Computer Science, 1988, pp. 156-165.
Cohen and Guibas, "Partial Matching of Planar Polylines Under Similarity Transformations," The eighth Annual ACM-SIAM Symposium On Discrete Algorithms, Jan. 1997, 777-786.
Cui et al., "Curve matching for open 2D curves," Pattern Recognition Letters, Jan. 2009, 30: 1-10.
Dijkstra, "A Note on Two Problems in Connexion with Graphs," Numerische Mathematik, 1959, 1: 269-271.
Efrat et al., "Curve Matching, Time Warping, and Light Fields: New Algorithms for Computing Similarity between Curves," J Math Imaging Vis, 2007, 27: 203-216.
Felzenszwalb and Zabih, "Dynamic Programming and Graph Algorithms in Computer Vision," Ieee Transactions on Pattern Analysis and Machine Intelligence, Apr. 2011, 33: 721-740.
Han and Jain, "Tattoo Based Identification: Sketch to Image Matching," In Proc. of the 6th IAPR International Conference on Biometrics (ICB), Jun. 4-7, 2013, 8 pages.
Heflin et al., "Detecting and Classifying Scars, Marks, and Tattoos Found in the Wild," In Proc. BTAS, 2012, 31-38.
Jain et al., "Tattoo-ID: Automatic Tattoo Image Retrieval for Suspect & Victim Identification," In Proc. IEEE PCM, 2007, 256-265.
Jurie and Schmid, "Scale-invariant shape features for recognition of object categories," Proceedings of the 2004 IEEE Computer Society Conference on Computer Vision and Pattern Recognition, 2004, 7 pages.
Kitti et al., "An Object Recognition and Identification System Using the Harris Corner Detection Method," International Journal of Machine Learning and Computing, Aug. 2012, 2: 462-465.
Lee et al., "Image Retrieval in Forensics: Tattoo Image Database Application," IEEE MultiMedia ,2012, 19: 40-49.
Lee et al., "Unsupervised Ensemble Ranking: Application to Large-Scale Image Retrieval," In Proc ICPR, 2010, 3902-3906.
Lowe, "Distinctive Image Features from Scale-Invariant Keypoints," International Journal of Computer Vision, 2004, 60(2): 91-110.
Ngan et al., "Tattoo Recognition Technology—Challenge (Tatt-C) Outcomes and Recommendations," NISTIR 8078, 2015.
Sivac and Zisserman, Video Google: A Text Retrieval Approach to Object Matching in Videos, In ICCV, 2003, 1-8.
Tsitsiklis, "Efficient Algorithms for Globally Optimal Trajectories," IEEE Transactions on Automatic Control, Sep. 1995, 40: 1528-1538.
Zhang, "Iterative Point Matching for Registration of Free-Form Curves and Surfaces," International Journal of Computer Vision, 1994, 13:2, 119-152.

\* cited by examiner

POLYGONAL APPROXIMATION

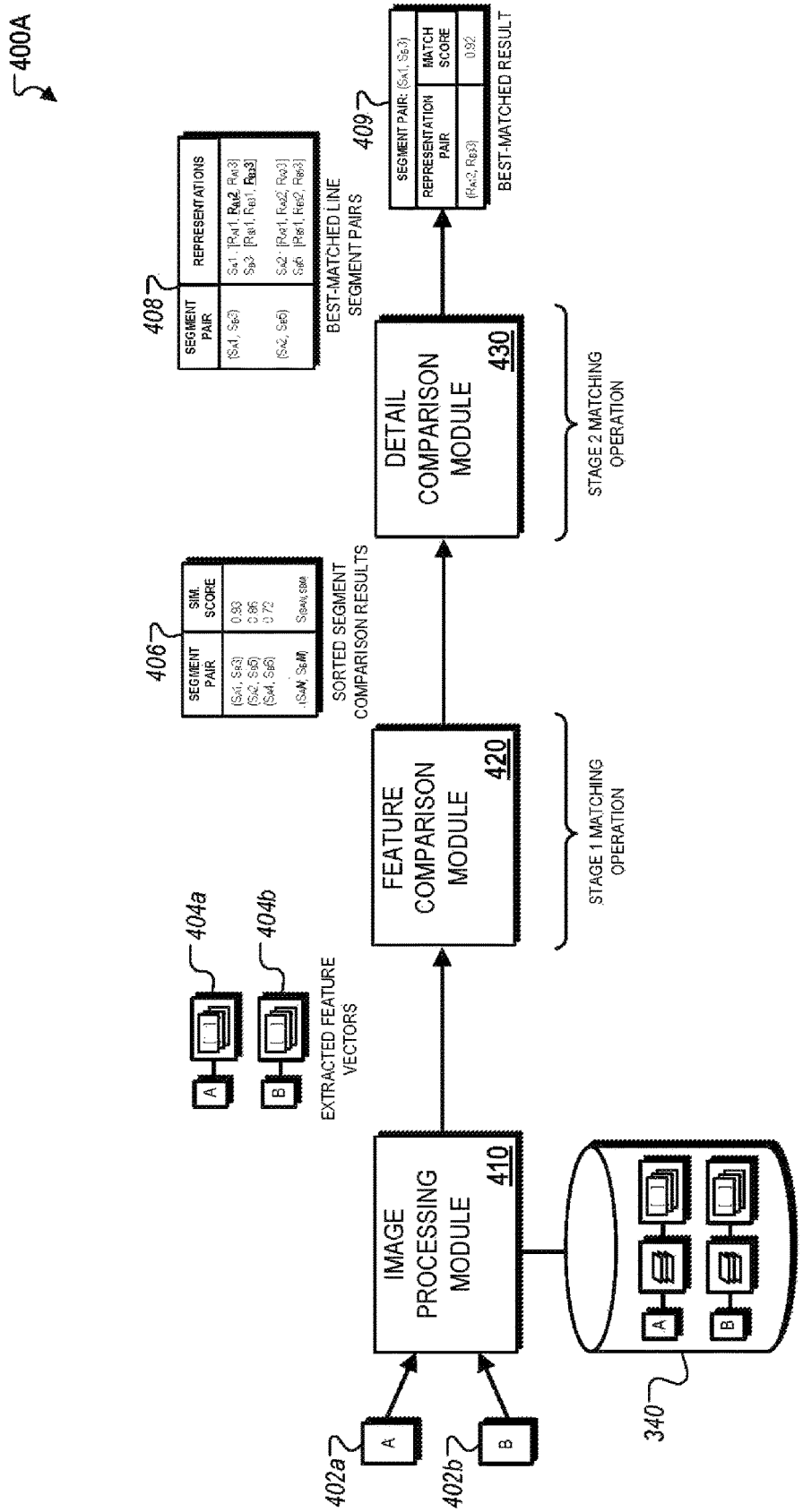
FIG. 4A FAST-CURVE MATCHING

FAST CURVE MATCHING FOR TATTOO RECOGNITION AND IDENTIFICATION

FIELD

The present specification relates generally to tattoo detection systems.

BACKGROUND

Automatic biometric identification systems are commonly used in many contexts to efficiently identify and verify the identity of individuals. For instance, automatic tattoo systems often make such identification or verification based on distinctive characteristics of tattoos present on a target's skin. In such systems, color or grayscale characteristics are extracted from an image that includes a tattoo and compared to a set of previously collected reference images.

SUMMARY

Automatic tattoo recognition systems often compare edge curves extracted from two tattoo images to determine if the two tattoo images include the same tattoo (or include a corresponding portion of a tattoo). However, tattoo images that are captured in non-ideal environments often include artifacts that reduce the accuracy and efficiency of tattoo matching when using such edge curve matching techniques. For example, two tattoo images that have varied geometric effects (e.g., differences in translation, rotation, scale, etc.) are often difficult to compare. In addition, many tattoo images often include distorted versions of a tattoo due to, for example, the tattoo being on a curved surface, interference in tattoo patterns due to skin or hair, or other types of imaging artifacts (e.g., noise, compression artifacts, etc.). Such effects often cause small local perturbations in the shape of boundary curves of a tattoo, and can often cause larger distortions in the shapes of small curves in low-resolution images.

Accordingly, one innovative aspect described throughout this specification includes a tattoo recognition system that is capable of improving the accuracy and efficiency associated with matching edge curves extracted from tattoo images, which are typically performed during a tattoo matching operation. The system can perform a matching operation in two stages—a feature extraction stage and a matching stage.

In the first stage, the system extracts one or more edge curves from the tattoo image. The system generates a set of polygonal approximations for each extracted edge curve, and identifies connected line segment sets that are included within each polygonal approximation. The system processes the geometric information associated with the connected line segment sets to generate a feature vector for each of the connected line segment sets. The system stores the generated vectors as "enrolled feature vectors" in an associated repository for use in a tattoo matching operation. The generated vectors can additionally, or alternatively, be stored as "search feature vectors" to identify the target tattoo by matching a query feature vector to the pre-extracted feature vectors of the pre-enrolled repository reference tattoo dataset.

In the second stage, the system performs matching using a two-step comparison. The first step of the comparison includes conducting a local matching procedure and the second step of the comparison includes conducting a global matching procedure. In performing the matching, the system uses the "search feature vectors" extracted from the search tattoo image in the first stage to perform the first step of the comparison.

During the first step of the comparison, the system compares the features of an input image and features of pre-extracted feature vectors of the pre-enrolled repository reference tattoo dataset. The system determines a set of best-matched line segment pairs based on the results of the first step comparison. Each best-matched line segment pair includes, for example, a first line segment associated with the search tattoo image and a second line segment associated with a reference tattoo image. In this example, the first line segment is determined to be similar to the second line segment. The system calculates geometric transformation parameters such as rotation, translation and scale, which are used in the second step comparison using the best-matched line segment pairs.

During the second step of the comparison, the system compares the features of the corresponding polygonal representations that include the line segments identified within the best-matched line segment pairs based on the geometric transformation parameters. The system determines a best-matched polygonal representation pair based on the results of the second step comparison. The best matched polygonal representation pair includes, for example, a first polygonal representation of an edge curve extracted from a search tattoo image and a second polygonal representation of an edge curve extracted from a reference tattoo image. In this example, the first polygonal representation is determined to be the most similar to the second polygonal representation from among all of the corresponding polygonal representations that include the line segments identified within the best-matched segment pairs. In some implementations, a similarity score computed for the best-matched polygonal representation score can then be used to compute a match score between a search tattoo image and a reference tattoo image.

The two-stage matching techniques described above can provide various advantages in performing curve matching for tattoo matching and/or recognition. For example, the techniques can be used to perform partial curve matching (e.g., matching a portion of a first curve to a portion of a second curve). In addition, the techniques can be insensitive to variability in polygonal representations caused by scale-related interference (e.g., when comparing two tattoo images at different resolutions). The techniques can also be performed independently from geometric effects of translation, rotation, and scale, which often vary between individual tattoo images, which enables the system to perform matching techniques that are insensitive to geometric distortions and/or other types of perturbations.

In one general aspect, a method can be performed by one or more computers. The method includes the following operations: obtaining data indicating edge curves extracted from a tattoo image; generating, for each of the edge curves, one or more polygonal representations, each polygonal representation reflecting a geometric approximation of a corresponding edge curve; identifying connected line segment sets that include each of the one or more polygonal representations; generating, for each of the identified connected line segment sets for each of the one or more polygonal representations, a feature vector of features characterizing a portion of particular edge curve that corresponds to a particular line segment set of a particular polygonal representation; and storing the one or more feature vectors for use in a tattoo matching operation.

Other versions include corresponding systems, and computer programs, configured to perform the actions of the methods encoded on computer storage devices.

One or more implementations may include the following optional features. For example, in some implementations, generating a polygonal representation for a particular edge curve includes: identifying two or more vertices along a pathway corresponding to a geometric approximation of the particular edge curve; and generating line segment sets between successive vertices identified along the pathway.

In some implementations, generating the one or more polygonal representations for the particular edge curve includes: obtaining a first polygonal representation generated for the particular edge curve, the first polygonal representation comprising two or more identified vertices along a pathway corresponding to a geometric approximation of the particular edge curve; selecting a vertex, from among the two or more identified vertices of the first polygonal representation, to remove from the first polygonal representation; and generating a second polygonal representation for the particular edge curve based on removing the selected vertex from among the two or more identified vertices of the first polygonal representation.

In some implementations, selecting the vertex to remove from the first polygonal representation includes: computing a distance for each line segment set defined by two successive vertices along the pathway corresponding to the geometric approximation of the particular edge curve; and selecting the vertex to remove from the first polygonal representation based at least on the computed distances for each line segment set defined by two successive vertices along the pathway corresponding to the geometric approximation of the particular edge curve.

In some implementations, the method can further include the following operations: computing, for each of the two or more identified vertices of the first polygonal representation, an error metric associated with removing a vertex from the first polygonal representation; determining a vertex from among the two or more identified vertices that has a lowest-value error metric; and where the vertex that is selected to be removed from the first polygonal representation is the vertex that is determined to have the lowest-value error metric.

In some implementations, generating the one or more polygonal representations for the particular edge curve includes generating a sequence of multiple polygonal representations. In such implementations, each of the multiple polygonal representations has an identifier that identifies a position of a polygonal representation within the sequence of multiple polygonal representations, and each polygonal representation have a greater number of vertices than the next sequential polygonal representation within the sequence of multiple polygonal representations.

In some implementations, the method includes the following operations: determining a number of vertices included a polygonal representation that is the first polygonal representation within the sequence of multiple polygonal representations. In such implementations, the system may perform a set of sub-operations for each polygonal representation included within the sequence of multiple polygonal representations. The set of sub-operations include: identifying, for each of the multiple vertices included in a polygonal representation, an x-coordinate and a y-coordinate of a vertex within the tattoo image, and determining a number of vertices included in the polygonal representation. The method also includes the operations of: storing the number of vertices included the polygonal representation that is the first polygonal representation within the sequence of multiple polygonal representations, and storing, for each polygonal representation included within the sequence of multiple polygonal representations, (i) the x-coordinate and y-coordinate identified for each of the multiple vertices included in the polygonal representations, and (ii) the determined number of vertices included in the polygonal representation.

In another general aspect, a method can be performed by one or more computers. The method includes the following operations: obtaining, from storage, data indicating (i) one or more search edge curves extracted from a search tattoo image, (ii) one or more search polygonal representations generated for each of the one or more search edge curves, and (iii) for each of the one or more search polygonal representations, search feature vectors generated for each of the connected line segment sets of a search polygonal representation; obtaining, from the storage, data indicating (i) one or more reference edge curves extracted from a reference tattoo image, (ii) one or more reference polygonal representations generated for each of the one or more reference edge curves, and (iii) for each of the one or more reference polygonal representations, reference feature vectors generated for each of the connected line segment sets of a polygonal representation.

The method further includes the following operations: comparing each of the reference feature vectors generated for each of the connected line segment sets of the one or more reference polygonal representations, and each of the search feature vectors generated for each connected line segment set of the one or more search polygonal representations; determining a set of best matched pairs of line segment sequences that each include (i) connected line segment sets of a search polygonal representation, and (ii) connected line segment sets of a reference polygonal representation, the connected line segment sets of the search polygonal representation being determined to match the connected line segment sets of the reference polygonal representation; for each of the best matched pairs, comparing features associated with a search polygonal representation within a best matched pair, and features associated with the reference polygonal representation that is matched to the search polygonal representation within the best matched pair; determining a best matched polygonal representation pair based on comparing features associated with a search polygonal representation within a best matched pair, and features associated with the reference polygonal representation that is matched to the search polygonal representation within the best matched pair; and computing a match score between the search tattoo image and the reference tattoo image based at least on determining the best matched polygonal representation pair.

In some implementations, the computed match score between the search tattoo image and the reference tattoo image is a similarity score computed for the search polygonal representation and the reference polygonal representation that is included in the best-matched polygonal representation pair.

In some implementations, determining the best matched polygonal representation pair includes: computing, for each of the best-matched pairs, a similarity score between a search polygonal representation within a best-matched pair and a reference polygonal representation within the best-matched pair; and identifying a particular best-matched pair determined to have the highest computed similarity score. In such implementations, the best match matched polygonal representation pair is a polygonal representation pair that includes the particular best-matched pair. Other implementations of these aspects include corresponding systems, apparatus and computer programs, configured to perform the actions of the methods, encoded on computer storage devices.

BRIEF DESCRIPTION OF THE DRAWINGS

FIG. 4A is a block diagram of an example of a system that is capable of performing a fast curve matching technique for matching two tattoo images.

In the drawings, like reference numbers represent corresponding parts throughout.

DETAILED DESCRIPTION

The following detailed description of the implementations of the disclosure refers to the accompanying drawings. The same reference numbers in different drawings may identify the same or similar elements. In addition, the following detailed description provides exemplary implementations of the concepts described within the claims, and should not be read as to limit their scope.

System Overview

Figure 1:
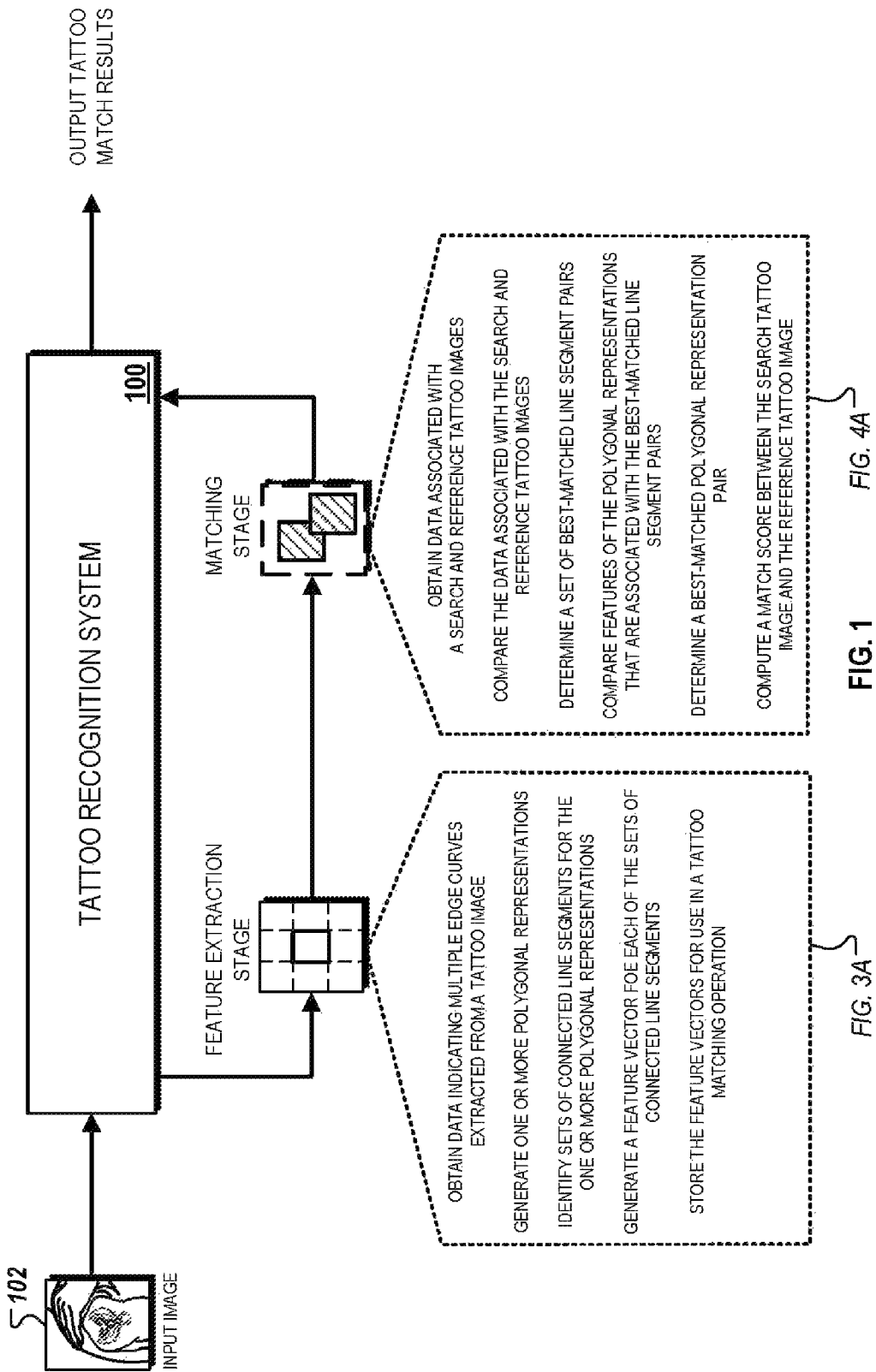
FIG. 1 illustrates a conceptual diagram for a tattoo matching procedure that includes a feature extraction stage and a matching stage.

FIG. 1 is a conceptual diagram that illustrates an example of a tattoo matching procedure. In the example depicted, a tattoo recognition system (TRS) 100 receives a tattoo image 102 as input, and performs a tattoo matching procedure that matches the tattoo image 102 with one or more reference tattoo images. The reference tattoo images can include, for example, previously collected tattoo images that are stored in a referential database for identifying match candidates for the tattoo image 102.

The TRS 100 can generally perform the matching operation in two stages—a feature extraction stage, and a matching stage. In the first stage, the TRS 100 extracts one or more edge curves from the tattoo image 102. The TRS 100 generates a set of polygonal approximations for each extracted edge curve, and identifies connected line segment sets that are included within each polygonal approximation. The TRS 100 processes the geometric information associated with the connected line segment sets to generate a feature vector for each of the connected line segment sets. The TRS 100 then stores the generated vectors as "search feature vectors" in an associated repository for use in a tattoo matching operation. The generated vectors can additionally, or alternatively, be stored as "search feature vectors" to identify the target tattoo by matching a query feature vector to the pre-extracted feature vectors of the pre-enrolled repository reference tattoo dataset. The polygonal approximation process of the feature extraction stage is depicted and described in detail below with respect to FIG. 3A.

In the second stage, the TRS 100 uses the search feature vectors generated in the feature extraction stage to perform a two-step comparison. During the first step comparison, the TRS 100 compares the features of the input image 102 and features of one or more reference tattoo images (with the use of reference feature vectors for that have previously been generated for the one or more reference tattoo images). The TRS 100 determines a set of best-matched line segment pairs based on the results of the first-step comparison. Each best-matched line segment pair includes, for example, a first line segment associated with the search tattoo image and a second line segment associated with a reference tattoo image. In this example, the first line segment is determined to be similar to the second line segment. The system calculates geometric transformation parameters such as rotation, translation and scale, which are used in the second step comparison using the best-matched line segment pairs.

The TRS 100 then performs a second step comparison, during which the TRS 100 compares the features of the corresponding polygonal representations that include the line segments identified within the best-matched line segment pairs. The TRS 100 determines a best-matched polygonal representation pair based on the results of the second step comparison. The best matched polygonal representation pair includes, for example, a first polygonal representation of an edge curve extracted from a search tattoo image and a second polygonal representation of an edge curve extracted from a reference tattoo image. In this example, the first polygonal representation is determined to be the most similar to the second polygonal representation from among all of the corresponding polygonal representations that include the line segments identified within the best-matched segment pairs. The fast-curve matching technique within the matching stage is depicted and described in detail below with respect to FIG. 4A.

Polygonal Representations

Figure 2A:
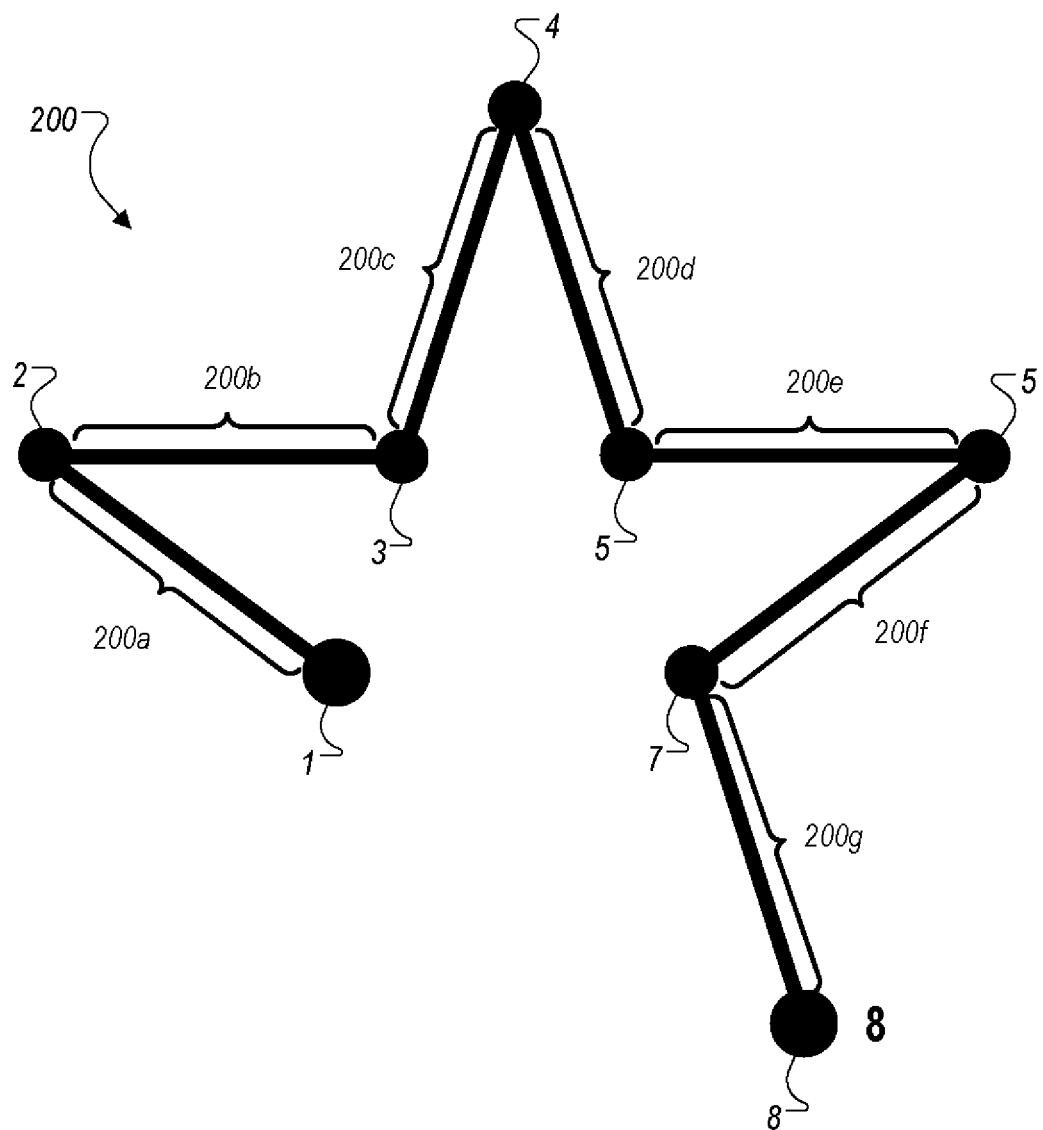
FIGS. 2A-2D are conceptual diagrams that illustrate examples of operations that can be performed using polygonal approximations for edge curves extracted from a tattoo image.
Figure 2B:
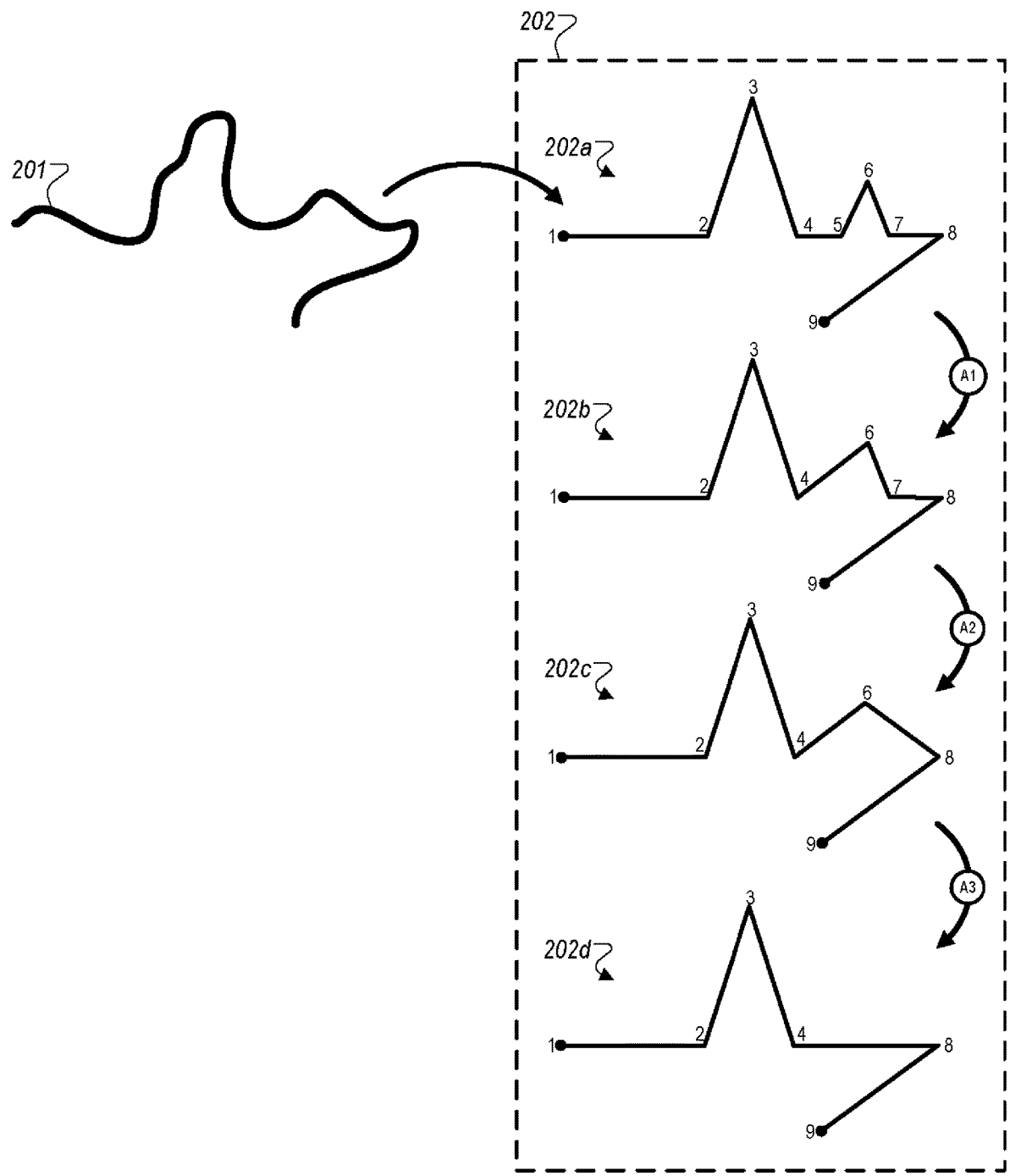
Figure 2C:
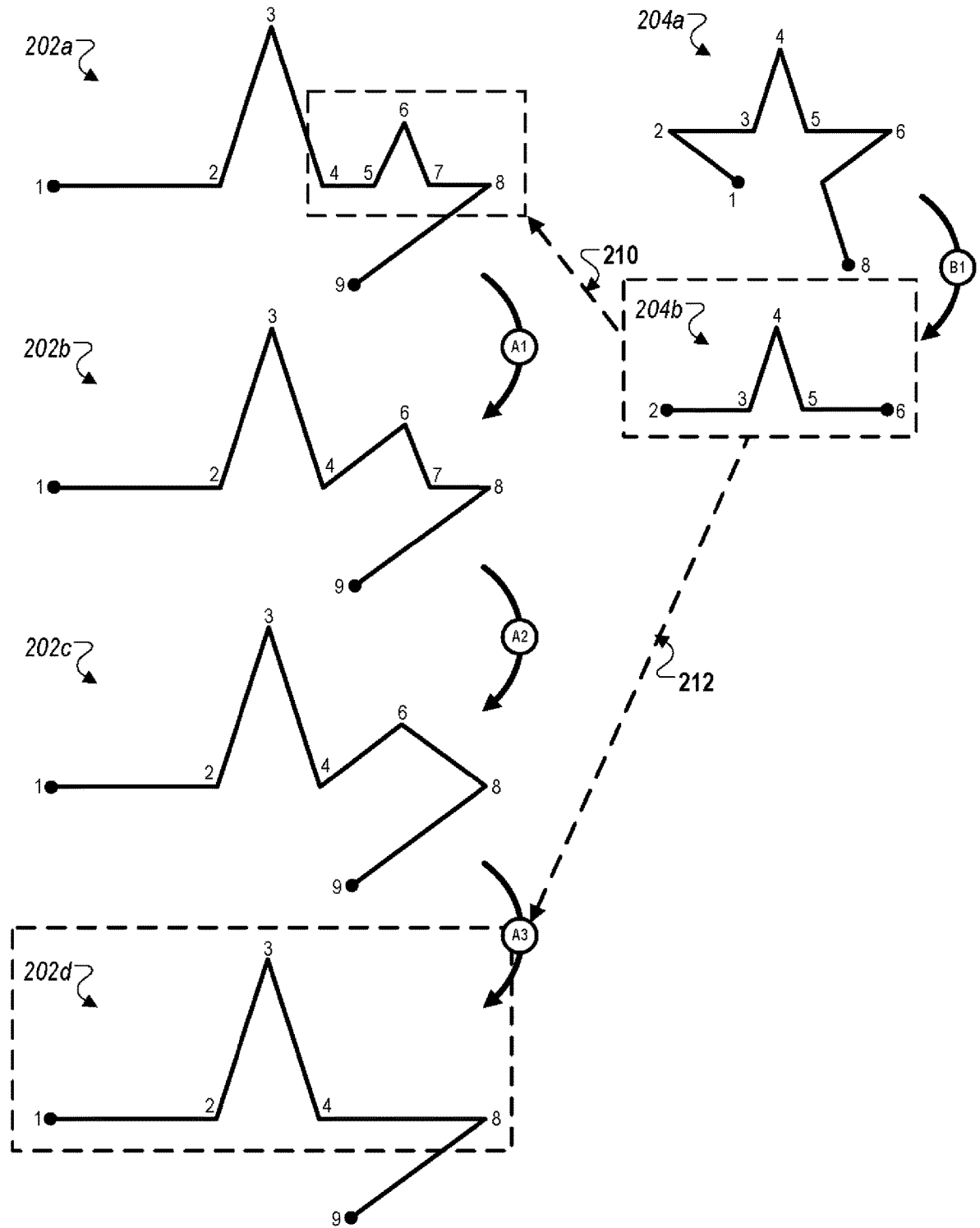
Figure 2D:
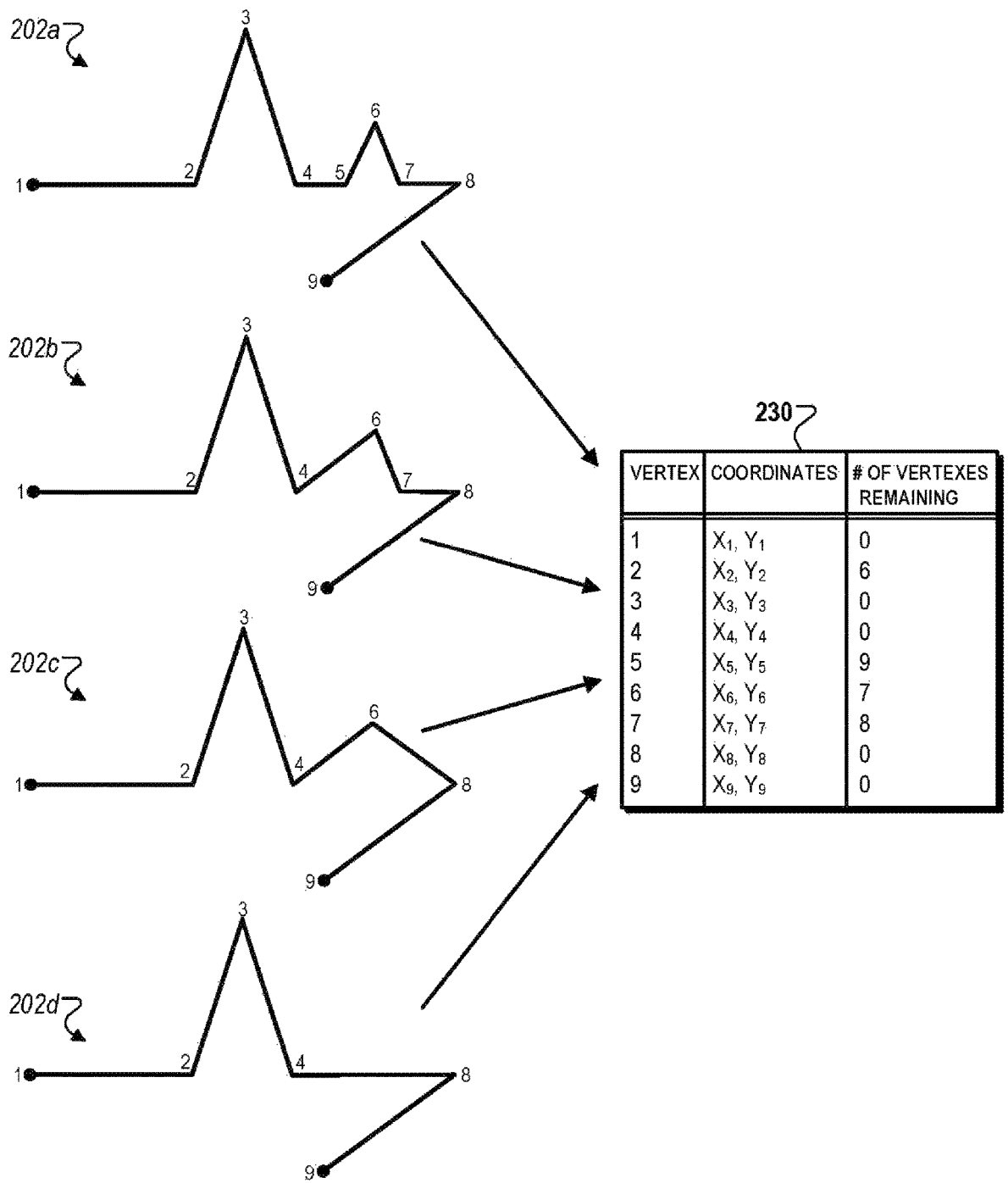

FIGS. 2A-2D are conceptual diagrams that illustrate examples of operations that can be performed using polygonal approximations for edge curves extracted from a tattoo image. FIG. 2A illustrates an example of a polygonal representation that is generated for an edge curve. FIG. 2B illustrates an example of a sequence of polygonal representations. FIG. 2C illustrates an example of a matching operation between two sets of polygonal representations at different scales. FIG. 2D illustrates an example of polygonal approximation data that is stored for a set of polygonal representations.

Referring initially to FIG. 2A, an example of a polygonal representation 200 for a "star-like" shape is depicted. In this example, the polygonal representation 200 includes seven connected line segments, which are depicted in the figure as connected line segments 200a-g. Two of the connected line segments are each connected at a vertex. The vertices of the polygonal representation 200 are identified in the figure with numerals "1" to "8."

As described above, a polygonal representation can be a geometric approximation of an edge curve extracted from a tattoo image (e.g., the tattoo image 102). For example, a curved portion of an edge curve can be represented as a set of connected line segments that are angled relative to one another so that the shape of the polygonal representation formed by the set of connected line segments is substantially similar to the original shape of the curved portion of the edge curve.

The quality of approximation, represented as a similarity of the geometric shape of the polygonal representation and the geometric shape of the edge curve, can be adjusted based on the number of connected line segments that are included in a polygonal representation. For example, a polygonal representation with a greater number of connected line segments may have a higher quality of approximation relative to a polygonal represent with a lower number of connected line segments for a particular edge curve. In some implementations, a system (e.g., the TRS 100) can determine a minimum number of connected line segments to include in a given polygonal representation based on a minimal quality of approximation needed to accurately match an edge curve of a tattoo image with other reference polygonal representations.

In some examples, the polygonal representation 200 can include five to seven sequential vertices from a corresponding edge curve, which includes enough spatial and geometric pattern information to make the polygonal representation distinctive during a matching operation described below. For example, the system can use three vertices to define an affine transformation and four points to define a homograph such that a polygonal representation defined by five or fewer vertices can potentially be mapped to any other polygonal representation with fewer than five points. In some implementations, the system may dynamically adjust the number of vertices that are included within a polygonal representation to, for example, balance the minimum number of points that are necessary to make an accurate match and the risk of adding to many points, which reduces the probability of obtaining an acceptable match.

Referring now to FIG. 2B, an example of a sequence 202a of polygonal representations is depicted. The sequence 202 includes individual polygonal representations 202a-d that are each sequentially generated for an edge curve 201 that is extracted from a tattoo image (e.g., the tattoo image 102). Sequential generation refers to the order in which each of the polygonal representations 202a-d are generated.

In the example depicted, the polygonal representation 202a is initially generated based on the extracted edge curve 202. The polygonal representation 202b is generated based on the polygonal representation 202a, the polygonal representation 202c is generated based on the polygonal representation 202b, and the polygonal representation 202d is generated based on the polygonal representation 202c. The sequential generation, in this example, refers to the order of operations specified by operations "A1," "A2," and "A3" as depicted in the figure. Therefore, once a system (e.g., the TRS 100) has performed the entirety of the sequential generation operation, the system generates the sequence 202 of polygonal representations.

The individual polygonal representations 202a-d can each be associated with a sequence identifier that identifies a position of a particular polygonal representation within the overall sequence. For instance, in the example depicted, the polygonal representation 202a can be associated with a sequence identifier "1," designating that it is the first polygonal representation within the sequence 202, whereas the polygonal representation 202d can be associated with a sequence identifier "4," designating that it is the fourth polygonal representation within the sequence 202. In other implementations, other suitable identification techniques can also be used to identify the position of an individual polygonal representation within a sequence of multiple polygonal representations.

At each stage, a subsequent polygonal representation within the sequence is generated based upon removing a vertex of polygonal representations that precedes it within the sequence. For example, the polygonal representation 202b is generated based upon removing the vertex "5" from the polygonal representation 202a, the polygonal representation 202c is generated based upon removing the vertex "7" from the polygonal representation 202b, and the polygonal representation 202d is generated based upon removing the vertex "6" from the polygonal representation 202a.

As shown in the figure, after a vertex has been removed, a new polygonal representation is generated based on connecting the remaining vertices using line segments. This technique can be referred to as a "sequential simplification" of an initial polygonal representation (e.g., the polygonal representation 202a). In this regard, each subsequent polygonal representation within a sequence of polygonal representations can be thought to be a simplification of the prior polygonal representation within the sequence because it includes a smaller number of vertices (e.g., a lower number of vertices represents a lower simplicity). As an example, the polygonal representation 202d is simpler than the polygonal representation 202b, which is simpler than the polygonal representation 202c, and so on.

When generating a subsequent polygonal representation as described above, the system may use various criteria to select an individual vertex to remove from a polygonal representation. The various criteria can be related to one or more approximation quality metrics that indicating a confidence that an individual polygonal representation accurately represents a geometric pattern of an edge curve. Approximation quality metrics can generally refer to metrics that are computed prior to the generation of a subsequent polygonal representation when selecting a vertex to remove from a polygonal representation.

In some implementations, the approximation quality metrics are computed based on a maximum computed distance between a candidate vertex to be removed and its "closest" vertices along a pathway of a polygonal representation. The pathway corresponds to the geometric approximation of an edge curve. As an example, a pathway of the polygonal representation 202a can be represented as the path that starts at vertex "1", continues along each intermediate vertex, and terminates at vertex "9." In this example, the two closest vertices of the vertex "2" in the pathway of the polygonal representation 202a is vertices "1" and "3." In such implementations, the maximum distance between each a candidate vertex and its two nearby vertices are computed and then used to select a vertex to remove from a polygonal representation. In the example depicted, the vertex "5" is selected as the vertex to remove to generate the polygonal representation 202b because its distance with the vertices "4" and "6" (the two closest vertices" is smaller than the computed distances for the other candidate vertices.

In the example discussed above, the computed distance between a candidate distance and its nearest vertices (or the lengths of the connected line segments that are connected at the candidate vertex) is used to select a vertex to remove. In this example, distance between vertices is used an indicator for geometric approximation error that results from a removal of a vertex (or conversely, an overall approximation quality measured for a polygonal representation that is generated after the removal of the vertex). Conceptually, larger distances between vertices are likely to cause more dramatic changes in the polygonal representation after removal, which can consequently decrease the approximation quality of the resulting polygonal representation.

Although maximal distance between vertices can be used as criteria to remove vertices in generating multiple polygonal representations for a sequence, in other implementations, other types of criteria can also be used. For example, alternative criteria can include average distance from removed vertices and their corresponding line segments, the maximum or average angular deviation from resulting line segments from the line segments of an initial polygonal representation (e.g., the polygonal representation 202a), and/or the total absolute change in the area of the polygonal representation added along each remaining curve segment. In some implementations, a combination of one or more criteria can also be used to remove vertices in generating subsequent polygonal representations.

Although not depicted in FIG. 2B, in some implementations, a polygonal representation can be a closed loop where a first vertex is also the last vertex of a pathway (e.g., a polygonal representation that is a hexagon). In such implementations, the first and the last vertex can initially be removed to generate an open polygonal representation. The vertex that is selected to be removed can be selecting using the techniques described above (e.g., based on maximizing an approximation quality and/or reducing a geometric approximation error).

FIG. 2B illustrates an example of a sequence 202 where a single vertex is removed between sequential polygonal representations. However, in other implementations, the sequence of polygonal representations where multiple vertices are removed between sequential polygonal representations. In such implementations, the system may use substantially similar techniques as described above to generate the sequence of polygonal representations. For example, the system may apply the sequential simplification technique, as described above, to remove multiple vertices between sequential polygonal representations.

In some implementations, the sequential simplification technique, as described above, is used to pre-process dense polygonal representations of a complex edge curve that is extracted from a tattoo image. In such implementations, the system may simply a densely-packed polygonal approximation (e.g., a polygonal representation that has over 100 vertices) to post-processed polygonal approximation that has a smaller number of vertices. The system can then use the sequential simplification technique to generate subsequent polygonal representations as described above. In this regard, the initial polygonal representation within a sequence of polygonal representations can be a simplified polygonal representation that is generated based on pre-processing a densely packed polygonal representation.

In some implementations, the system dynamically determines a total number of polygonal representations to be included within a given sequence of polygonal representations such as the sequence 202. This determination can be based on stop criteria that, once satisfied, determines the last polygonal representation within a sequence. The stop criteria can be based on, for example, a minimum number of vertices that are included within a polygonal representation. In other examples, the stop criteria can be defined by a threshold accuracy metric for a given polygonal approximation. In such examples, once the system determines that an accuracy metric for a given polygonal approximation within the sequence fails to satisfy the threshold, the preceding polygonal approximation is then set as the final polygonal approximation within the sequence.

Referring now to FIG. 2C, an example of a matching operation between two sets of polygonal representations of different scales is depicted. A first set of polygonal representations includes four polygonal representations that are referenced in the figure as polygonal representations 202a-d. A second set of polygonal representations, in contrast, includes two polygonal representations that are referenced in the figure as polygonal representations 204a-b. In addition, in the example depicted, the first and second set of polygonal representations are at different scales (e.g., different pixel resolutions and/or pixel sizes causing different distances between segments). The polygonal representations that are included in each set are generated using the sequential simplification technique described previously with respect to FIG. 2B.

During a matching operation, each individual polygonal representation within the first set is compared against each individual polygonal representation within the second set. For example, the polygonal representation 202a is compared against the polygonal representations 204a and 204b, and so on for all other polygonal representations included in the first set. In this example, after the system has compared all combinable pairs of polygonal representations within the first set and the second set, the system identifies two match results.

Match result 210 indicates a detected similarity between a portion of the polygonal representation 202a (e.g., a portion defined by vertices "4," "5," "6," "7" and "8") and the entirety of the polygonal representation 204b. The match result 212 indicates a detected similarity between a portion of the polygonal representation 202d (e.g., a portion defined by vertices "1," "2," "3," "4" and "8") and the entirety of the polygonal approximation 204b. In this example, the match result 210 represents a sequential match between initial polygonal representations that are generated for two edge curves (e.g., the polygonal representations 202a and 204a). However, the match result 212 is identified only after sequential polygonal representations of the initial polygonal representations are generated and compared. In this instance, this match result is identified after intervening vertices in the initial polygonal representations are removed.

The exemplary matching operation illustrates how the sequential simplification techniques can be used to address various problems relating to matching two edge curves at different scales. For instance, the polygonal representations 202a and 204b are at different resolution scales because the associated tattoo images from which they were extracted have different resolutions. This may complicate the curve matching process because higher resolution curves may preserve a greater number of features (e.g., a larger number of connected line segments) than the lower resolution curve. Without the simplification process, as described above, potential feature matches may be missed because the low-resolution curve fails to include feature information that can be used to determine a match.

In many instances, it is substantially difficult to identify corresponding segments between edge curves at when matching images at different resolutions scales. In this regard, the sequential simplification technique enables the generation of multiple polygonal representations, increasing an overall likelihood that one or more multiple matches will be identified, as illustrated in FIG. 2C. In addition, because the system tracks a sequential position of a polygonal representation within a sequence of polygonal representations, identified matches can be augmented based on geometric approximation techniques used to generate each sequential polygonal representation.

Additionally, the number of identified matches can be increased by comparing the distance between vertices of two polygonal representations as well as the relative arrangement of corresponding vertices between two polygonal representations. For instance, in the examples of match result 212, the portion of the polygonal representation 202d is identified as a match to the polygonal representation 204b even though the distance between the corresponding vertices are at different scales because corresponding portions of the polygonal representations 202d and 204b have the same arrangement of vertices.

Referring now to FIG. 2D, an example of polygonal approximation data 230 that is stored for the set of polygonal representations 204a-d is depicted. The polygonal approximation data 230 is generated based on geometric spatial information associated with connected line segments included within a sequence of polygonal representations that includes the polygonal representations 202b-d. In this example, a system (e.g., the TRS 100) stores the polygonal approximation data 230 to reduce storage space required to space the geometric spatial information compared to storing the polygonal representations 202a-d in their entirety. In this regard, the generation and storage of the polygonal approximation data 230 can be used reduce the storage requirements for polygonal representations (and thereby enable the system to store a greater number of polygonal representations for a single tattoo image, store polygonal approximation data for a greater number of tattoo images, or both).

The polygonal approximation data 230 includes information for the system to construct each of the polygonal representations included within a sequence of polygonal representations based on an initial polygonal representation for the sequence. As depicted, the polygonal approximation data 230 includes data for each vertex of the polygonal representation 202a. For example, the polygonal approximation data 230 includes coordination locations of each vertex within a tattoo image (e.g., x and y-coordinates) and sequence identification information.

The sequence identification information, for instance, can include a number of vertices that are remaining after a particular vertex has been removed in order to identify the removal of the particular vertex within the sequence. For example, because vertex "5" is the first vertex that is removed from the polygonal representation 202a to generate the polygonal representation 202b, the polygonal approximation data 230 species nine remaining vertices. Given stored version of the polygonal representation 202, the system can then use this information to infer the geometric approximation of the polygonal representation 202b without actually storing it. In addition, because the polygonal approximation data 230 includes information for each vertex, the system can also recover each of the polygonal representations 202c and 202d based solely on the contents of the polygonal approximation data 230. In this regard, the contents of the polygonal approximation can be referred to as "canonical representations" of the polygonal representations, Although not depicted in the figure, the polygonal approximation data 230 can also include curve segment representation information (e.g., spatial information that represents distinctive aspects of connected line segments and arrangements of connected line segments that are contained within a polygonal representation). For example, the polygonal approximation data 230 can include a bending angle between adjacent line segments.

Additionally, in operation, a system (e.g., the TRS 100) can use the polygonal approximation data 230 to reduce the speed associated with polygonal representations of different edge curves. For example, the system may use the x and y-coordinates of vertices to identify corresponding segments of two polygonal representations (e.g., based on their locations within the image and their relative arrangement). In other examples, the contents within the polygonal approximation data 230 can be used to reconstruct the multiple polygonal representations with a given sequence, which are then compared to other polygonal representations of another sequence as described above with respect to FIG. 2C. Thus, because the system is capable of reconstructing spatial information associated with each polygonal representation within a sequence from the contents of the polygonal approximation data, the speed of such a comparison can often be reduced relative to a direct comparison.

In some implementations, the polygonal approximation data 230 includes only spatial data for a subset of vertices that are determined to be distinctive and/or representative of distinctive geometric patterns within a polygonal representation. In such implementations, the system identifies vertices that are associated with distinctive geometric patterns and stores their associated spatial information to, for example, reduce storage space associated with the polygonal approximation data 230, or reduce the amount of data that is used to compare two polygonal representations (and therefore, improve the overall speed of comparison).

Polygonal Approximation

Figure 3A:
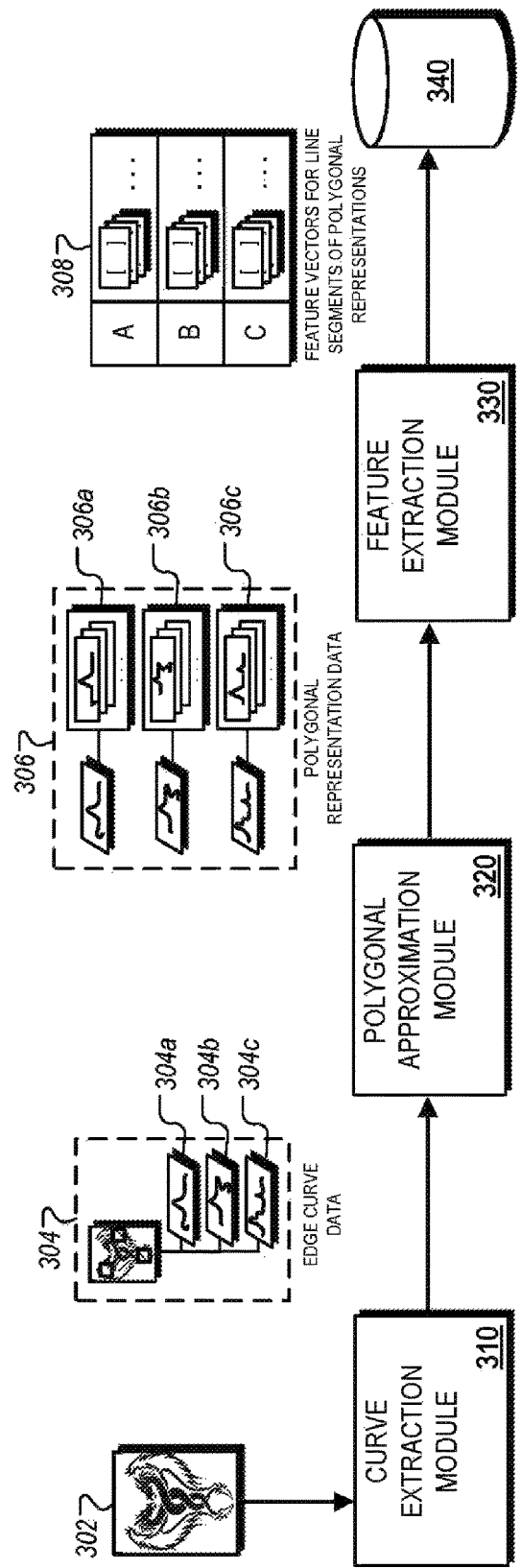
FIG. 3A illustrates a block diagram of a system that is capable of generating polygonal approximations for edge curves detected within a tattoo image.

FIG. 3A illustrates a block diagram of a system 300A that is capable of generating polygonal representations for edge curves detected within a tattoo image. The system 300A can include a curve extraction module 310, a polygonal approximation module 320, a feature extraction module 330, and a storage module 340. In some implementations, the system 300A can be a component of, or configured to exchange communications with, the TRS 100. For example, as described below, the components of the system 300A can execute a set of operations relating to polygonal approximation prior to a fast-curving matching as described above in FIG. 1.

In general, the system 300A initially receives a tattoo image 302 as input. A curve extraction module 310 processes the tattoo image 302 and extracts a set of edge curves representing distinctive patterns associated with a portion of a tattoo included in the tattoo image 302. A polygonal approximation module 320 generates polygonal representations for each of the edge curves that are extracted from the tattoo image 302. A feature extraction module 330 analyzes the geometric and spatial information of line segments of each polygonal representation and generates a set of feature vectors that are associated with each polygonal representation. The feature vectors are then stored in a repository for use in the fast-curve matching procedure illustrated in described below with respect to FIG. 4A.

In the example depicted, the curve extraction module 310 initially process the input image 320 and generates edge curve data 304. The edge curve data 304 includes edge curves 304a-c that are extracted from the input tattoo image 302. As described above, the edge curves 304a-c can represent distinctive patterns and/or shapes that are used to identify a tattoo included within the tattoo image 302.

The curve extraction module 310 may extract the edge curves 304a-c using any suitable extraction technique. For example, the curve extraction module 310 can construct the edge curves 304a-c by using image processing techniques to identify pixels within the tattoo image 302 that are associated with an edge curve pattern. The curve extraction module 310 then traces curve indices in a specified order to generate an edge curve.

During the edge curve extraction process, the curve extraction module 310 may perform various processing techniques prior to, or after, the extraction to adjust the representation of an extracted edge curve. For example, if an extracted edge curve is densely packed with a large number of connected line segments, the curve extraction module 310 may pre-process the extracted edge curve by simplifying its shape in order as described above.

The polygonal approximation module 320 processes the edge curves 304*a-c* included within the edge curve data 304 and generates polygonal representation data 306. The polygonal representation data 306 includes sets of polygonal representations 306*a-c* corresponding to each of the edge curves 304*a-c*, respectively. As described above, each set of polygonal representations can be a sequence of polygonal representations that are generated by the polygonal approximation module 320 using the sequential simplification techniques described above with respect to FIGS. 2A-2D. For example, the set of polygonal representations 306*a* can include an initial polygonal representation that is generated for the edge curve 304*a*, and a set of sequential polygonal representations that are each generated based on simplifying a preceding polygonal representation within the sequence by removing a selected vertex.

The polygonal approximation module 320 may use various techniques to generate and/or represent the sets of polygonal representations 306*a-e*. For instance, in some implementations, after generating a polygonal representation, the polygonal approximation module 320 centers each connected line segment of the polygonal representation. The connected line segments can then be normalized in terms of size, and rotated such that an axis through its two connected vertices is aligned with a reference axis (e.g., the x-axis). For example, the polygonal approximation module 320 can normalize the size of each connected line segment by dividing x and y-coordinates of the vertices of a polygonal representation by a standard deviation associated with a set of polygonal representations. In this example, an axis is drawn through a second vertex from each end of a line segment and the axis of the line segment is rotated to align with the reference axis. In some implementations, the alignment procedure described above can be performed along two references (e.g., reference x and y-axis).

As discussed above, each set of polygonal representations that are associated with a particular edge curve includes multiple geometric approximations for that particular edge curve. The individual polygonal representations within a set of polygonal representations vary in simplicity (e.g., the number of vertices included in a polygonal representation). In this regard, each individual polygonal representation within a set of polygonal approximations can be used to represent an alternative geometric approximation for a single edge curve, which, can be used to improve the likelihood of identifying a matching edge curve based on comparing each of their associated polygonal representations.

The feature extraction module 330 processes geometric and spatial information included within the sets of polygonal representations 306 to generate feature vector data 308. The feature vector data 308 includes feature vectors that are computed for each of the sets of polygonal representations 306*a*, 306*b*, and 306*c*. Each feature vector can include multiple features that are extracted from the polygonal representations.

The feature extraction module 330 may generate the feature vectors in a variety of configurations. In some implementations, a feature vector is generated for each connected line segment that is included within a polygonal representation. For example, the feature extraction module 330 may generate five feature vectors for a polygonal representation that includes five connected line segments. In this example, multiple feature vectors are generated for each polygonal representation and a set of feature vectors are generated for each set of polygonal representations that correspond to a particular edge curve. Alternatively, in other implementations, the feature extraction module 330 may generate a feature vector for each polygonal representation. In these implementations, each feature vector includes features that are collected for all of the connected line segments that are included within a polygonal representation.

The feature vectors include various types of features that are descriptive of the spatial and/or geometric attributes of the connected line segments that are included within a polygonal representation. Examples of features can include a direction angle of a connected line segment (e.g., an angle of a connected line segment relative to a reference axis), a bending angle between two connected line segments, a measured length of a line segment, coordinate locations of vertices that connect two connected line segments, among other types of distinctive attributes that enable the system to identify a polygonal representation that includes the connected line segment.

The feature extraction module 330 stores the feature vector data 308 in the repository 340 for use in a tattoo matching operation as described below. As described above, because the feature vectors for polygonal representations are pre-computed prior to performing a tattoo matching operations, a system (e.g., the TRS 100) is capable of reducing the speed associated with matching edge curves that are compared for two tattoo images to be matched. In this regard, the system is capable of performing edge curve matching with greater speed compared to traditional tattoo matching systems that extract edge curves online during a matching operation.

Figure 3B:
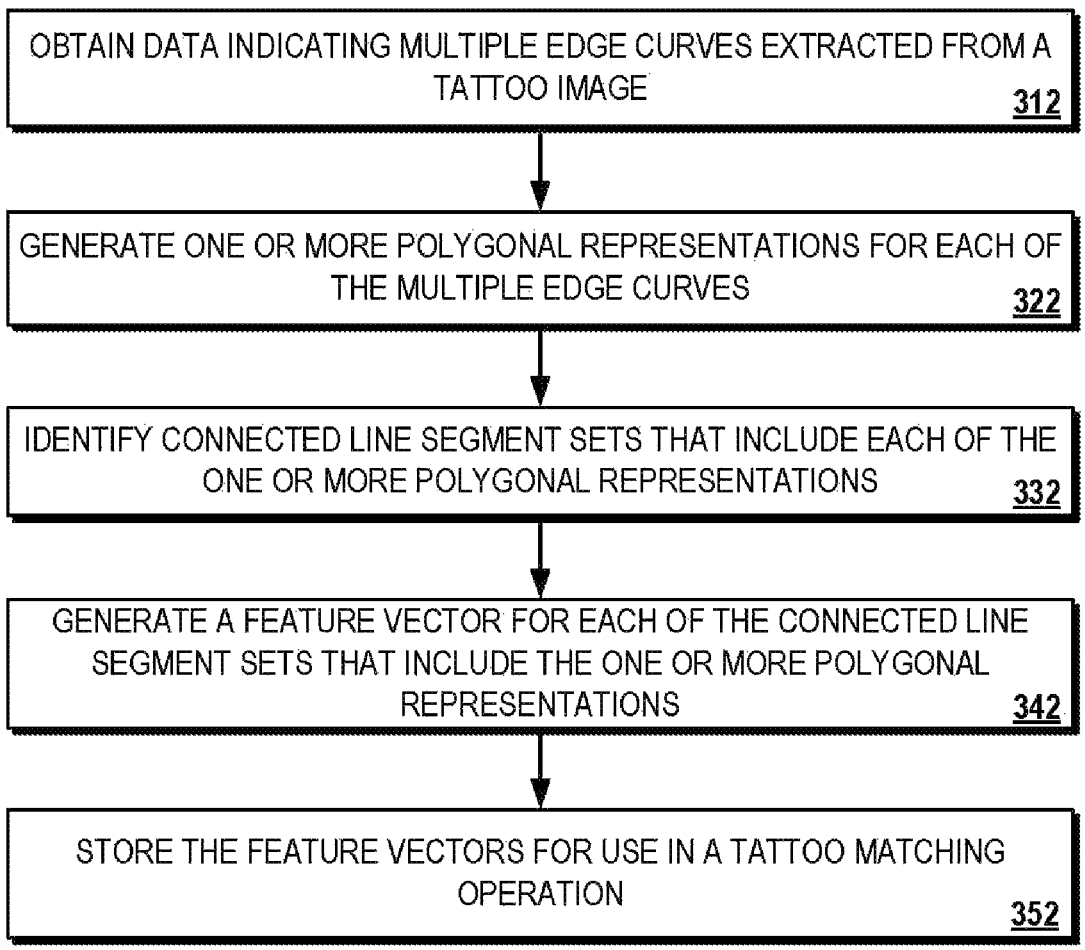
FIG. 3B is a flowchart of an example of a process for generating polygonal approximations for edge curves detected within a tattoo image.

FIG. 3B illustrates a flowchart of a process 300B for generating polygonal approximations for edge curves detected within a tattoo image. Briefly, the process 300B can include obtaining data indicating multiple edge curves extracted from a tattoo image (312), generating one or more polygonal representations for each of the multiple edge curves (322), identifying connected line segment sets that include each the one or more polygonal representations (332), generating a feature vector for each of the connected segment set that include the one or more polygonal representations (342), and storing the feature vectors for use in a tattoo matching operation (352).

In more detail, the process 300B can include obtaining data indicating multiple edge curves extracted from a tattoo image (312). For example, as depicted in FIG. 3A, the curve extraction module 310 can obtain edge curve data 304. The edge curve data 304 can indicate edge curves 304*a-c* that extracted from the tattoo image 302. The edge curves 304*a-c* can represent distinctive patterns and/or regions of the tattoo of the tattoo image 302.

The process 300B can include generating one or more polygonal representations for each of the multiple edge curves (322). For example, as depicted in FIG. 3A, the polygonal approximation module 320 can generate one or more polygonal representations for each of the edge curves 304*a-c*. In this example, the polygonal approximation module 320 generates the sets of polygonal representations 306a-c are for the edge curves 304a-c, respectively, using the sequential simplification techniques described above with respect to FIGS. 2A-2D. Each polygonal representation within the set of polygonal representations can be reflective of a geometric approximation of a corresponding edge curve. For example, individual polygonal representations included within the set of polygonal representations 306a are reflective of a geometric approximation for the edge curve 304a.

The process 300B can include identifying connected line segment sets that include each the one or more polygonal representations (332). For example, the polygonal approximation module 320 can identify connected line segment sets that make up each of the generated polygonal representations. As described above with respect to FIGS. 2A-2D, a connected line segment represents a line segment defined by two sequential vertices along a pathway of a polygonal representation. Referring to the example depicted in FIG. 2A, the polygonal representation 200 includes connected line segments 200a-g, which are all defined by vertices "1" to "8" along a pathway from vertex "1" to vertex "8." The polygonal approximation module 320 can identify the line segments for each polygonal representation within the sets of polygonal representations 306a-c.

The process 300B can include generating a feature vector for each of the connected segment set that include the one or more polygonal representations (342). For instance, as depicted in FIG. 3A, the feature extraction module 330 generates a feature vector for each of the identified connected line segment sets for each of the one or more polygonal representations included within the sets of polygonal representations 306a-c. As described above, each feature vector characterizes a portion of a particular edge curve that corresponds to a particular set of line segment of particular polygonal representation. Referring to the example depicted in FIG. 2A, the feature extraction module 330 may compute a feature vector for each of the line segments 200a-g of the polygonal representation 200. The generated feature vectors can include, for example, coordinate locations of associated vertices, a directional angle of a line segment relative to a reference axis, or a bending angle between two adjoining connected line segments.

In some implementations, the feature extraction module 330 may aggregate features associated with connected line segments to generate feature vectors for each polygonal representation included within the sets of polygonal representations 306a-c. For example, referring back to the example depicted in FIG. 2A, features associated with each of the line segments 200a-g can be combined to generate a single feature vector for the polygonal representation 200 (as opposed to generating individual feature vectors for each of the connected line segments 200a-g). In the same manner, the feature extraction module 330 may additionally, or alternatively, combine features of multiple polygonal representations to generate a feature vector for each of the sets of polygonal representations 306a-c. For example, feature vectors of polygonal representations included in the set of polygonal representations 306a can be combined to generate a single feature vector for the entire set.

The process 300B can include storing the feature vectors for use in a tattoo matching operation (352). For example, after generating the feature vectors as described above in step 342, the feature extraction module 330 may store the generated feature vectors in the repository 340. As described above and below with respect to FIGS. 4A and 4B, the stored feature vectors can then be used in a fast-curve matching operation for two tattoo images to be compared.

Fast Curve Matching

FIG. 4A illustrates a block diagram of a system 400A that is capable of performing a fast curve matching technique for matching two tattoo images. The system 400A can include an image-processing module 410, a feature comparison module 420, and a detail comparison module 430. In some implementations, the system 400A can be a component of, or configured to exchange communications with, the TRS 100. For example, the components of the system 400A can execute a set of operations relating to fast-curve matching as described above in FIG. 1.

In addition, the systems 300A and 400A can be implemented in one or more hardware elements the collectively perform the operations described throughout. For example, the systems 300A and 400A can be configured as separate logical components on a single computing system. Alternatively, the systems 300A and 400A can also be configured as separate physical components on two or more separate computing systems that exchange data transmissions over a communication network.

In general, the system 400A performs a tattoo matching operation that compares edge curves that are extracted from two tattoo images to determine if they represent a match (e.g., if the two tattoo images include the same tattoo, or include corresponding regions that have the same patterns or distinctive attributes). The system 400A matches the two tattoos by comparing features of edge curves that are extracted from the two tattoo images. In particular, the system 400A compares features of polygonal representations of the extracted edge curves.

The system 400A compares the features associated with two tattoo images using a two-stage matching procedure—a feature extraction stage and a matching stage. The first feature extraction stage is used to identify a set of best-matched line segments (or specific portions of polygonal representations between the two tattoo images that are determined to have corresponding features).

The matching stage is used to identify a best-match polygonal representation pair between the two tattoo images (the two corresponding polygonal representations between the two images that are determined to have the greatest overall correspondence relative to the other corresponding polygonal representation pairs). The degree of correspondence between the best-matched polygonal representation pair can be used to determine if the two tattoo images represent match candidates as described above. In some instances, one of the tattoo images can be a search tattoo image (e.g., an unknown tattoo image that is searched against a set of known reference tattoo images) and a reference tattoo image.

In the example depicted, the image processing module 410 initially receives tattoo images 402a and 402b as input for a tattoo matching operation. The image-processing module 410 obtains data associated with one or more of the tattoo images 402a and 402b that are stored within the repository 340. For instances where the polygonal approximation techniques described above in FIG. 3A have been performed for both of the tattoo images 402a and 402b, the image processing module 410 obtains data associated with both images as shown in the example in FIG. 4A. In other instances, if one of the input images is a latent tattoo image that has not been pre-processed, the image processing module 410 may perform the operations described above with respect to FIG. 3A. For example, in such instances, the image-processing module 410 may extract edge curves from the latent tattoo image, compute a set of polygonal representations for each extracted edge curve, and compute feature vectors that include features of the connected line segments that are included in the sets of polygonal representations.

The feature comparison module 420 processes the data obtained from the repository 340 and performs the first step comparison of the matching operation described above. The obtained data includes feature vectors 404a associated with the tattoo image 402a, and feature vectors 404b associated with the tattoo image 402b. In particular, the feature comparison module 420 compares features included within the feature vectors 404a and 404b to identify corresponding line segments. For example, as shown in FIG. 2C, the feature comparison module 420 can identify two individual line segments that share similar features irrespective of the polygonal representations that include the line segments. Referring back to the example shown in FIG. 2C, although the polygonal representation 202a is different from the polygonal representation 204b, the system identifies a sequential match between a first set of line segments defined by vertices "4" to "8" in the polygonal representation 202a, and a second set of line segments defined by vertices "2" to "6" in the polygonal representation 202b.

The feature comparison module 420 compares each connected line segment included within the set of polygonal representations associated with each of the tattoo images 402a and 402b. As an example, the tattoo images 402a and 402b can each include five polygonal representations that include three line segments each. In this example, the feature comparison module 420 compares each of the fifteen line segments associated with the tattoo image 402a and each of the 15 line segments associated with the tattoo image 402b for 210 comparisons.

The feature comparison module 420 computes similarity scores for each of the line segment comparisons, which are included in the comparison results 406. The feature comparison module 420 identifies the line segment pairs that are determined to have the highest similarity scores, indicating a highest degree of correspondence between features that are compared. These line segment pairs are identified as "best-match" line segment pairs because these pairs are determined to have the highest likelihood of having matching or corresponding features within the tattoo images.

Each best-matched line segment pair includes a search line segment of a polygonal representation extracted from a search tattoo image (e.g., the tattoo image 402a) and a corresponding reference line segment of a polygonal representation extracted from a reference tattoo image (e.g., the tattoo image 402b). In this example, a line segment pair can be considered to be "best-matched" because, for instance, the line segments within the pair have been determined to have a similarity score value that satisfies a predetermined threshold. Alternatively, the line segment pair can also be considered to be "best matched" because the value of the similarity score of its line segments are determined to be included in a group of highest-value similarity scores.

The feature comparison module 420 may use various techniques to identify the best-matched line segment pairs. In the example depicted in FIG. 4A, the feature comparison module 420 sorts a list of all possible line segment pairs based on similarity score values. As shown, the comparison results 406 includes a sorted list of connected line segment pairs where the line segment pairs that are identified at the top of the list are determined to have the highest similarity scores. For example, the connected line segment pair "($S_A1$, $S_B3$)" includes a line segment "$S_A1$" from a polygonal representation associated with the tattoo image 402a and a line segment "$S_A2$" from a polygonal representation associated with the tattoo image 402b. This pair is determined to the best-matched line segment pair because of its similarity score.

The feature comparison module 420 can identify the best-matched line segment pairs based on applying a predetermined threshold, and selecting a subset of the line segment pairs that are determined to have similarity scores that satisfy the predetermined threshold. In other implementations, the feature comparison module 420 may use other suitable filtering techniques to select the best-matched line segment pairs from among the all-possible line segment pairs that are identified within the comparison results 406.

In the example depicted, the feature comparison module 420 applies a predetermined threshold value of "0.85" and selects the line segment pairs that are determined to have a similarity score that satisfies this predetermined threshold value as the best-matched line segment pairs. For instance, in this example, the line segment pairs "($S_A1$, $S_B3$)" and "($S_A2$, $S_B5$)" are determined to be the best-matched line segment pairs that are then sent to the detail comparison module 430.

The detail comparison module 430 performs the second step comparison of the matching operation described above. During this operation, the detail comparison module 430 compares data of the polygonal representations that are determined to include the line segments identified within the best-matched line segment pairs.

The detail comparison module 430 generates best-matched line segment data 408, which identifies, for each of the tattoo images 402a and 402b, corresponding polygonal representations that include the line segments within the best-matched line segment pairs of line segment sequences "($S_A1$, $S_B3$)" and "($S_A2$, $S_B5$)." As shown, the best-matched line segment data 408 identifies the polygonal representations of the tattoo image 402a that include the best-matched line segments "$S_A1$" and "$S_A2$," and the polygonal representations of the tattoo image 402b that include the best-matched line segments "$S_B3$" and "$S_B5$."

The detail comparison module 430 compares the features of each of the identified polygonal representation that includes one or more of the line segments included within the best-matched line segment pairs in a manner similar to the comparison described above. Compared to the first step comparison of the matching operation, however, the detail comparison module 430 compares global features (e.g., features associated with an entire polygonal representation) as opposed to the features associated with a specific line segment (or a portion of a polygonal representation). The detail comparison module 430 computes similarity scores for each polygonal representation pair based on comparing the features of a polygonal representation of the tattoo images 402a and 402b. The detail comparison module 430 then determines a best-matched polygonal representation pair that is determined to have the highest similarity score from among the all of the polygonal representations that are compared, which is identified in best matched result 409.

In the example depicted, the detail comparison module 430 determines that the best-matched polygonal representation pair is "($R_{A1}2$, $R_{B3}3$)," which includes a polygonal representation "$R_{A1}2$" including a best-matched line segment "$S_A1$," and a polygonal representation "$R_{B3}3$" including a best-matched line segment "$S_B3$." In this example, the polygonal representations are compared based on the line segments they include (e.g., polygonal representations that include the "$S_A1$" line segment are compared against polygonal representations that include the "$S_B3$" line segment). In addition, this example, the similarity score of the best-matched polygonal representation (e.g., [$R_{A1}2$, $R_{B3}3$]) is selected to represent a match score between the tattoo images 402a and 402b. Given a value of the match score (e.g., "0.92" out of "1.0"), the system 400A determines, in this example, that the tattoo images 402a and 402b either include the same tattoo or include similar attributes indicating a correspondence in one or more image regions.

Figure 4B:
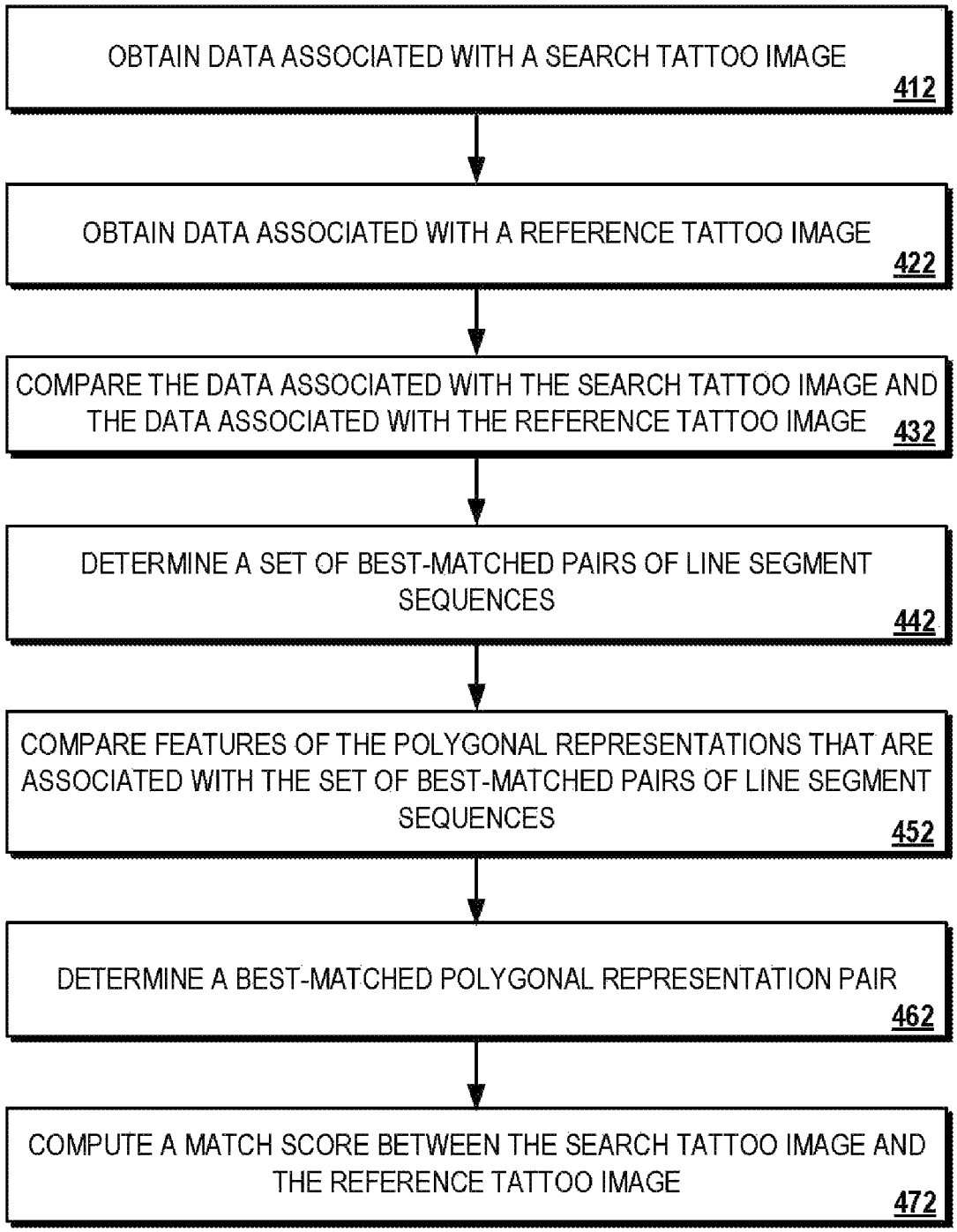
FIG. 4B is a flowchart of an example of a process for performing a fast curve matching technique for matching two tattoo images.

FIG. 4B illustrates a flowchart of a process 400B for performing a fast curve matching technique for matching two tattoo images. Briefly, the process 400B can include obtaining data associated with a search tattoo image (412), obtaining data associated with a reference tattoo image (422), comparing the data associated with the search tattoo image and the data associated with the reference tattoo image (432), determining a set of best pairs of line segment sequences (442), comparing features of the polygonal representations that are associated with the set of best pairs of line segment sequences (452), determining a best matched polygonal representation pair (462), and computing a match score between the search tattoo image and the reference tattoo image (472).

In detail, the process 400B can include obtaining data associated with a search tattoo image (412). For example, as depicted in FIG. 4A, the image processing module 410 can obtain data associated with the tattoo image 402a from the repository 340. As described above, the obtained data for each tattoo image can include one or more edge curves extracted from a particular tattoo image, one or more polygonal representations that are generated for each of the one or more edge curves, and feature vectors generated for each set of connected line segments of each of the one or more polygonal representations. In some implementations, the obtained data can be the data that is previously generated offline during the feature extraction stage depicted in FIG. 3A. Alternatively, in other implementations, where the system has not previously performed a polygonal approximation operation for one of the tattoo images to be searched, the image processing module 410 may instead generate the obtained data on the fly using the techniques illustrated in FIG. 3A.

The process 400B can include obtaining data associated with a reference tattoo image (422). For example, as depicted in FIG. 4A, the image processing module 410 can obtain data associated with the tattoo image 402b that is stored in the repository 340. The image processing module 410 may obtain similar types of data as described above for the tattoo image 402a in step 412.

The process 400B can include comparing the data associated with the search tattoo image and the data associated with the reference tattoo image (432). For example, the feature comparison module 420 can generally compare each of the feature vectors 404a to each of the feature vectors 404b. As described above with respect to FIG. 4A, the feature vectors 404a are each associated with the tattoo image 402a, and the feature vectors 404b are each associated with the tattoo image 402b. The comparison can be used to identify corresponding line segments within the tattoo images 402a and 402b based on identifying similar features within their feature vectors. In the example depicted in FIG. 4A, the output of the comparisons is the comparison results 406, which indicates a respective similarity score computed for each of the compared line segment pairs. In this example, the similarity score represents a determined likelihood that individual line segments within a line segment pair represent matching or corresponding line segments in two tattoo images (e.g., the tattoo images 402a and 402b).

The process 400B can include determining a set of best-matched pairs of line segment sequences (442). For example, as depicted in FIG. 4A, the detail comparison module 430 can determine a set of best-matched line segment pairs based on the comparisons performed in step 432. In this example, the detail comparison module 430 selects a subset of the line segment pairs that are included within the comparison results 406 that have the greatest similarity scores as the best-matched line segment pairs. In this example, the detail comparison module 430 determines that the line segment pairs "($S_A1$, $S_B3$)" and "($S_A2$, $S_B5$)" represent the best-matched line segment pairs based on the respective values of their similarity scores.

The process 400B can include comparing features of the polygonal representations that are associated with the set of best-matched pairs of line segment sequences (452). For example, the detail comparison module 430 can, for each of the best-matched line segment pairs, compare features associated with the respective polygonal representations that include the line segments. In the example depicted in FIG. 4A, the detail comparison module 430 can initially determine all of the polygonal representations associated with the tattoo image 402a that include the line segments "$S_A1$" and "$S_A2$" (the best-matched line segment determined for the tattoo image 402a). The detail comparison module 430 also determines of the polygonal representations associated with the tattoo image 402b that include the line segments "$S_B3$" and "$S_B5$" (the best-matched line segments determined for the tattoo image 402b). The detail comparison module 430 then compares each of the corresponding polygonal "representations that are identified. In the example, the features of polygonal representations that include the line segment "$S_A1$" are compared against the features of the polygonal representations that include the line segment "$S_B3$." Additionally, the features of polygonal representations that include the line segment "$S_A2$" are compared against the features of the polygonal representations that include the line segment "$S_B5$."

The process 400B can include determining a best matched polygonal representation pair (462). For example, the detail comparison module 430 determines a best-matched polygonal representation pair based on comparing features associated with corresponding polygonal representations as described above in step 452. In the example depicted in FIG. 4A, the detail comparison module 430 determines that the best-matched matched polygonal representation pair is one that includes the polygonal representation "$R_{A1}2$" from the tattoo image 402a and the polygonal representation "$R_{B3}3$" from the tattoo image 402b. In this example, the best-matched polygonal representation pair can be identified based on computing a similarity score for each pair of corresponding polygonal representations that are compared in step 452. The polygonal representation pair that is has the highest computed similarity score can be determined to represent the best-matched polygonal representation pair.

The process 400B can include computing a match score between the search tattoo image and the reference tattoo image (472). For example, in some implementations such as the example depicted in FIG. 4A, the similarity score computed for the best-matched polygonal representation pair can be selected to represent match score between the tattoo images 402a and 402b. In the example, the similarity score for the best matched polygonal representation pair "($R_{A1}2$, $R_{B3}3$)" is determined to have a value of "0.92," which is then determined by the detail comparison module 430 to be the match score between the tattoo images 402a and 402b.

Alternatively, in other implementations, the match score can be, for example, a weighted combination of similarity scores for the top-matched polygonal representation pairs. For example, the top-matched polygonal representation pairs can represent a subset of the polygonal representation pairs identified within the best-matched line segment data 408 that have the greatest similarity scores. The match score, in these implementations, can be computed based on combining the respective similarity scores of each of the top-matched polygonal representation pairs. In some instances, the detail comparison module 430 can use various weighting techniques to compute the combined match score.

Figure 5:
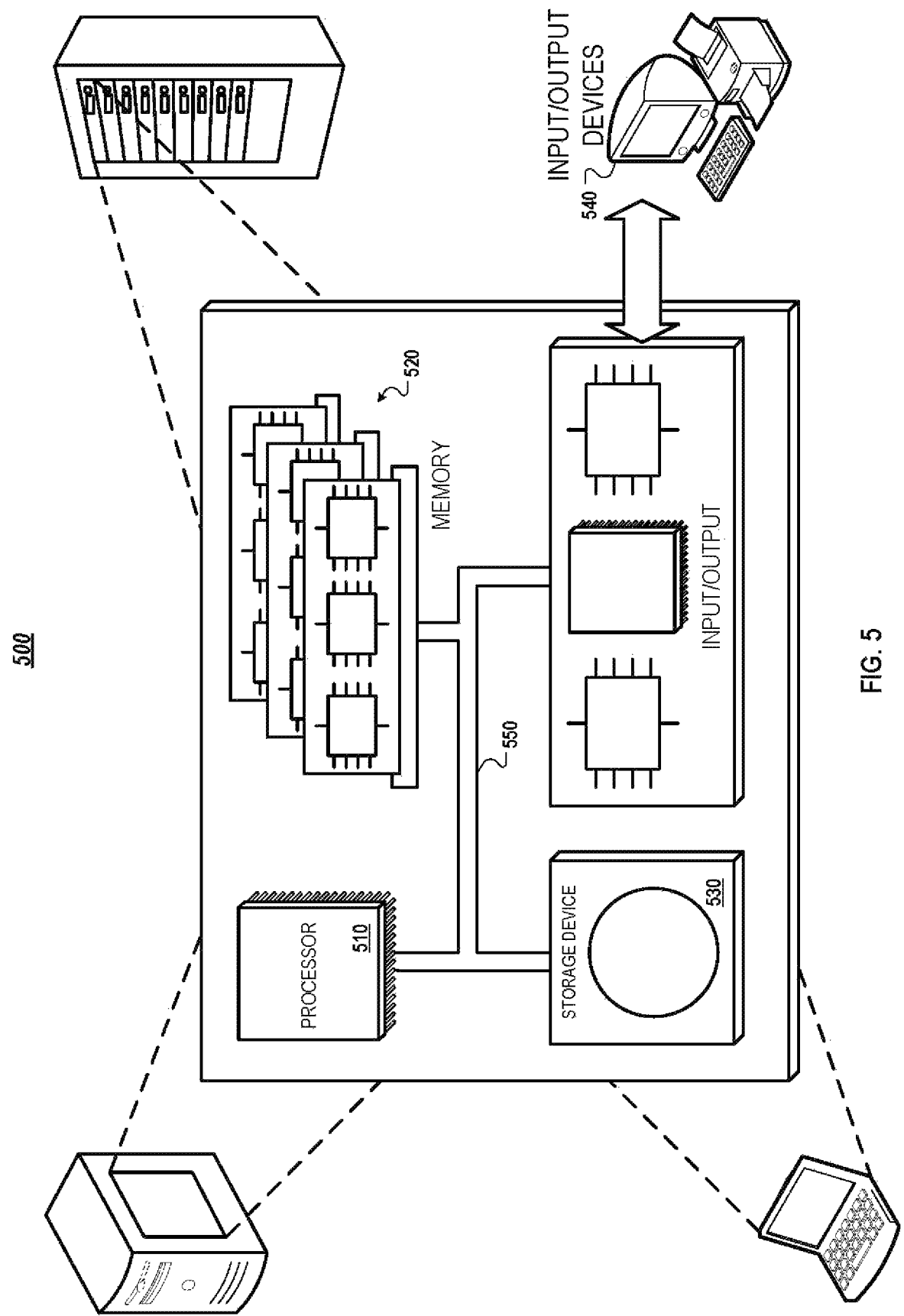
FIG. 5 is a block diagram of computing devices on which the processes described herein, or portions thereof, may be implemented.

FIG. 5 is a schematic diagram of a computer system 500. The system 500 can be used to carry out the operations described in association with any of the computer-implemented methods described previously, according to some implementations. In some implementations, computing systems and devices and the functional operations described in this specification can be implemented in digital electronic circuitry, in tangibly embodied computer software or firmware, in computer hardware, including the structures disclosed in this specification (e.g., system 500) and their structural equivalents, or in combinations of one or more of them. The system 500 is intended to include various forms of digital computers, such as laptops, desktops, workstations, personal digital assistants, servers, blade servers, mainframes, and other appropriate computers, including vehicles installed on base units or pod units of modular vehicles. The system 500 can also include mobile devices, such as personal digital assistants, cellular telephones, smartphones, and other similar computing devices. Additionally the system can include portable storage media, such as, Universal Serial Bus (USB) flash drives. For example, the USB flash drives may store operating systems and other applications. The USB flash drives can include input/output components, such as a wireless transmitter or USB connector that may be inserted into a USB port of another computing device.

The system 500 includes a processor 510, a memory 520, a storage device 530, and an input/output device 540. Each of the components 510, 520, 530, and 540 are interconnected using a system bus 540. The processor 510 is capable of processing instructions for execution within the system 500. The processor may be designed using any of a number of architectures. For example, the processor 510 may be a CISC (Complex Instruction Set Computers) processor, a RISC (Reduced Instruction Set Computer) processor, or a MISC (Minimal Instruction Set Computer) processor.

In one implementation, the processor 510 is a single-threaded processor. In another implementation, the processor 510 is a multi-threaded processor. The processor 510 is capable of processing instructions stored in the memory 520 or on the storage device 530 to display graphical information for a user interface on the input/output device 540.

The memory 520 stores information within the system 500. In one implementation, the memory 520 is a computer-readable medium. In one implementation, the memory 520 is a volatile memory unit. In another implementation, the memory 520 is a non-volatile memory unit.

The storage device 530 is capable of providing mass storage for the system 500. In one implementation, the storage device 530 is a computer-readable medium. In various different implementations, the storage device 530 may be a floppy disk device, a hard disk device, an optical disk device, or a tape device.

The input/output device 540 provides input/output operations for the system 500. In one implementation, the input/output device 540 includes a keyboard and/or pointing device. In another implementation, the input/output device 540 includes a display unit for displaying graphical user interfaces.

A number of implementations have been described. Nevertheless, it will be understood that various modifications may be made without departing from the spirit and scope of the invention. In addition, the logic flows depicted in the figures do not require the particular order shown, or sequential order, to achieve desirable results. In addition, other steps may be provided, or steps may be eliminated, from the described flows, and other components may be added to, or removed from, the described systems. Accordingly, other implementations are within the scope of the following claims.

It should be understood that processor as used herein means one or more processing units (e.g., in a multi-core configuration). The term processing unit, as used herein, refers to microprocessors, microcontrollers, reduced instruction set circuits (RISC), application specific integrated circuits (ASIC), logic circuits, and any other circuit or device capable of executing instructions to perform functions described herein.

It should be understood that references to memory mean one or more devices operable to enable information such as processor-executable instructions and/or other data to be stored and/or retrieved. Memory may include one or more computer readable media, such as, without limitation, hard disk storage, optical drive/disk storage, removable disk storage, flash memory, non-volatile memory, ROM, EEPROM, random access memory (RAM), and the like.

Additionally, it should be understood that communicatively coupled components may be in communication through being integrated on the same printed circuit board (PCB), in communication through a bus, through shared memory, through a wired or wireless data communication network, and/or other means of data communication. Additionally, it should be understood that data communication networks referred to herein may be implemented using Transport Control Protocol/Internet Protocol (TCP/IP), User Datagram Protocol (UDP), or the like, and the underlying connections may comprise wired connections and corresponding protocols, for example, Institute of Electrical and Electronics Engineers (IEEE) 802.3 and/or wireless connections and associated protocols, for example, an IEEE 802.11 protocol, an IEEE 802.15 protocol, and/or an IEEE 802.16 protocol.

A technical effect of systems and methods described herein includes at least one of: (a) increased accuracy in facial matching systems; (b) reduction of false accept rate (FAR) in facial matching; (c) increased speed of facial matching.

Although specific features of various implementations of the invention may be shown in some drawings and not in others, this is for convenience only. In accordance with the principles of the invention, any feature of a drawing may be referenced and/or claimed in combination with any feature of any other drawing.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. A method performed by one or more computers, the method comprising:
   obtaining data indicating an edge curve extracted from a tattoo image;
   generating a sequence of multiple polygonal representations for the edge curve, wherein each polygonal representation included in the sequence of multiple polygonal representations (i) reflects a geometric approximation of the edge curve, and (ii) has an identifier that identifies a position of a polygonal representation within the sequence of multiple polygonal representations, and (iii) has a greater number of vertices than a next sequential polygonal representation within the sequence of multiple polygonal representations;
   identifying connected line segment sets that include each of the multiple polygonal representations;
   generating, for each of the identified connected line segment sets, a feature vector of features characterizing a portion of particular the edge curve that corresponds to a particular line segment set included in the multiple polygonal representations; and
   storing the one or more feature vectors for use in a tattoo matching operation.

2. The method of claim 1, wherein generating the sequence of multiple polygonal representations for the edge curve comprises:
   identifying two or more vertices along a pathway corresponding to a geometric approximation of the edge curve; and
   generating line segment sets between successive vertices identified along the pathway.

3. The method of claim 1, wherein generating the sequence of multiple polygonal representations for the edge curve comprises:
   obtaining a first polygonal representation generated for the edge curve, the first polygonal representation comprising two or more identified vertices along a pathway corresponding to a geometric approximation of the edge curve;
   selecting a vertex, from among the two or more identified vertices of the first polygonal representation, to remove from the first polygonal representation; and
   generating a second polygonal representation for the edge curve based on removing the selected vertex from among the two or more identified vertices of the first polygonal representation.

4. The method of claim 3, wherein selecting the vertex to remove from the first polygonal representation comprises:
   computing a distance for each line segment set defined by two successive vertices along the pathway corresponding to the geometric approximation of the edge curve; and
   selecting the vertex to remove from the first polygonal representation based at least on the computed distances for each line segment set defined by two successive vertices along the pathway corresponding to the geometric approximation of the edge curve.

5. The method of claim 4, further comprising:
   computing, for each of the two or more identified vertices of the first polygonal representation, an error metric associated with removing a vertex from the first polygonal representation;
   determining a vertex from among the two or more identified vertices that has a lowest-value error metric; and
   wherein the vertex that is selected to be removed from the first polygonal representation is the vertex that is determined to have the lowest-value error metric.

6. The method of claim 3, further comprising:
   determining a number of vertices included a polygonal representation that is the first polygonal representation within the sequence of multiple polygonal representations;
   for each polygonal representation included within the sequence of multiple polygonal representations:
     identifying, for each of the vertices included in a polygonal representation, an x-coordinate and a y-coordinate of a vertex within the tattoo image, and
     determining a number of vertices included in the polygonal representation;
   storing the number of vertices included the polygonal representation that is the first polygonal representation within the sequence of multiple polygonal representations, and
   storing, for each polygonal representation included within the sequence of multiple polygonal representations, (i) the x-coordinate and y-coordinate identified for each of the vertices included in the polygonal representations, and (ii) the determined number of vertices included in the polygonal representation.

7. A system comprising:
   one or more computers; and
   one or more storage devices storing instructions that, when executed by the one or more computers, cause the one or more computers to perform operations comprising:
     obtaining data indicating an edge curve extracted from a tattoo image;
     generating a sequence of multiple polygonal representations for the edge curve, wherein each polygonal representation included in the sequence of multiple polygonal representations (i) reflects a geometric approximation of the edge curve, and (ii) has an identifier that identifies a position of a polygonal representation within the sequence of multiple polygonal representations, and (iii) has a greater number of vertices than a next sequential polygonal representation within the sequence of multiple polygonal representations;
     identifying connected line segment sets that include each of the multiple polygonal representations;
     generating, for each of the identified connected line segment sets, a feature vector of features characterizing a portion of the edge curve that corresponds to a particular line segment set included in the multiple polygonal representations; and
     storing the one or more feature vectors for use in a tattoo matching operation.

8. The system of claim 7, wherein generating the sequence of multiple polygonal representations for the edge curve comprises:
   identifying two or more vertices along a pathway corresponding to a geometric approximation of the edge curve; and
   generating line segment sets between successive vertices identified along the pathway.

9. The system of claim 7, wherein generating the sequence of multiple polygonal representations for the edge curve comprises:

obtaining a first polygonal representation generated for the edge curve, the first polygonal representation comprising two or more identified vertices along a pathway corresponding to a geometric approximation of the edge curve;

selecting a vertex, from among the two or more identified vertices of the first polygonal representation, to remove from the first polygonal representation; and generating a second polygonal representation for the edge curve based on removing the selected vertex from among the two or more identified vertices of the first polygonal representation.

10. The system of claim 9, wherein selecting the vertex to remove from the first polygonal representation comprises:

computing a distance for each line segment set defined by two successive vertices along the pathway corresponding to the geometric approximation of the edge curve; and selecting the vertex to remove from the first polygonal representation based at least on the computed distances for each line segment set defined by two successive vertices along the pathway corresponding to the geometric approximation of the edge curve.

11. The system of claim 10, wherein the operations further comprise:

computing, for each of the two or more identified vertices of the first polygonal representation, an error metric associated with removing a vertex from the first polygonal representation;

determining a vertex from among the two or more identified vertices that has a lowest-value error metric; and wherein the vertex that is selected to be removed from the first polygonal representation is the vertex that is determined to have the lowest-value error metric.

12. A non-transitory computer-readable storage device encoded with computer program instructions that, when executed by one or more computers, cause the one or more computers to perform operations comprising:

obtaining data indicating an edge curve extracted from a tattoo image;

generating a sequence of multiple polygonal representations for the edge curve, wherein each polygonal representation included in the sequence of multiple polygonal representations (i) reflects a geometric approximation of the edge curve, and (ii) has an identifier that identifies a position of a polygonal representation within the sequence of multiple polygonal representations, and (iii) has a greater number of vertices than a next sequential polygonal representation within the sequence of multiple polygonal representations;

identifying connected line segment sets that include each of the multiple polygonal representations;

generating, for each of the identified connected line segment sets, a feature vector of features characterizing a portion of the edge curve that corresponds to a particular line segment set included in the multiple polygonal representations; and storing the one or more feature vectors for use in a tattoo matching operation.

13. The non-transitory computer-readable storage device of claim 12, wherein generating the sequence of multiple polygonal representations for the edge curve comprises:

identifying two or more vertices along a pathway corresponding to a geometric approximation of the edge curve; and generating line segment sets between successive vertices identified along the pathway.

14. The non-transitory computer-readable storage device of claim 12, wherein generating the sequence of multiple polygonal representations for the edge curve comprises:

obtaining a first polygonal representation generated for the edge curve, the first polygonal representation comprising two or more identified vertices along a pathway corresponding to a geometric approximation of the edge curve;

selecting a vertex, from among the two or more identified vertices of the first polygonal representation, to remove from the first polygonal representation; and generating a second polygonal representation for the edge curve based on removing the selected vertex from among the two or more identified vertices of the first polygonal representation.

15. The non-transitory computer-readable storage device of claim 14, wherein selecting the vertex to remove from the first polygonal representation comprises:

computing a distance for each line segment set defined by two successive vertices along the pathway corresponding to the geometric approximation of the edge curve; and selecting the vertex to remove from the first polygonal representation based at least on the computed distances for each line segment set defined by two successive vertices along the pathway corresponding to the geometric approximation of the edge curve.

16. The non-transitory computer-readable storage device of claim 15, wherein the operations further comprise:

computing, for each of the two or more identified vertices of the first polygonal representation, an error metric associated with removing a vertex from the first polygonal representation;

determining a vertex from among the two or more identified vertices that has a lowest-value error metric; and wherein the vertex that is selected to be removed from the first polygonal representation is the vertex that is determined to have the lowest-value error metric.

17. A method comprising:

obtaining data indicating an edge curve extracted from a tattoo image;

obtaining a first polygonal representation generated for the edge curve, the first polygonal representation comprising two or more identified vertices along a pathway corresponding to a geometric approximation of the edge curve;

selecting a vertex, from among the two or more identified vertices of the first polygonal representation, to remove from the first polygonal representation;

generating a second polygonal representation for the edge curve based on removing the selected vertex from among the two or more identified vertices of the first polygonal representation;

identifying connected line segment sets that include each of the first polygonal representation and the second polygonal representation;

generating, for each of the identified connected line segment sets, a feature vector of features characterizing a portion of the edge curve that corresponds to a particular line segment set included in the connected line segment sets; and storing the one or more feature vectors for use in a tattoo matching operation.

18. The method of claim 17, wherein generating the second polygonal representation for the edge curve comprises:

identifying two or more vertices along a pathway corresponding to a geometric approximation of the edge curve; and generating line segment sets between successive vertices identified along the pathway.

19. The method of claim 17, wherein selecting the vertex to remove from the first polygonal representation comprises:

computing a distance for each line segment set defined by two successive vertices along the pathway corresponding to the geometric approximation of the edge curve; and selecting the vertex to remove from the first polygonal representation based at least on the computed distances for each line segment set defined by two successive vertices along the pathway corresponding to the geometric approximation of the edge curve.

* * * * *